(12) United States Patent
Davis et al.

(10) Patent No.: US 8,310,124 B2
(45) Date of Patent: Nov. 13, 2012

(54) MULTISTAGE VARIABLE RELUCTANCE MOTOR/GENERATOR

(75) Inventors: John A Davis, King City (CA); Iain C Davis, King City (CA); Feisal A Hurzook, Toronto (CA)

(73) Assignee: Sunco Investments Limited, Hamilton (BM)

( * ) Notice: Subject to any disclaimer, the term of this patent is extended or adjusted under 35 U.S.C. 154(b) by 0 days.

(21) Appl. No.: 13/398,420

(22) Filed: Feb. 16, 2012

(65) Prior Publication Data

US 2012/0212094 A1    Aug. 23, 2012

Related U.S. Application Data

(63) Continuation of application No. 12/311,380, filed as application No. PCT/CA2008/001503 on Aug. 22, 2008, now Pat. No. 8,138,652.

(60) Provisional application No. 60/957,914, filed on Aug. 24, 2007.

(51) Int. Cl.
*H02K 17/42* (2006.01)
(52) U.S. Cl. ............... 310/168; 310/216.057; 310/114
(58) Field of Classification Search ........... 310/166, 310/168, 112, 114, 216.075
See application file for complete search history.

(56) References Cited

U.S. PATENT DOCUMENTS

| | | | |
|---|---|---|---|
| 2,824,983 A | 2/1958 | Cametti et al. | |
| 31,950 A | 4/1961 | Brush | |
| 3,401,285 A * | 9/1968 | French et al. | 310/168 |
| 3,518,468 A | 6/1970 | Wightman | |
| 3,663,127 A | 5/1972 | Cheers | |
| 3,995,203 A * | 11/1976 | Torok | 318/701 |
| 4,143,308 A | 3/1979 | Deplante et al. | |
| 4,670,696 A | 6/1987 | Byrne et al. | |
| 4,743,176 A | 5/1988 | Fry | |
| 4,916,346 A * | 4/1990 | Kliman | 310/257 |
| 5,012,177 A | 4/1991 | Dhyanchand et al. | |
| 5,115,181 A | 5/1992 | Sood | |
| 5,200,659 A * | 4/1993 | Clarke | 310/112 |
| 5,222,874 A | 6/1993 | Unnewehr et al. | |
| 5,304,882 A * | 4/1994 | Lipo et al. | 310/156.53 |
| 5,365,137 A * | 11/1994 | Richardson et al. | 310/216.039 |
| 5,372,213 A | 12/1994 | Hasbe et al. | |
| 5,404,091 A | 4/1995 | Radun | |
| 5,433,282 A | 7/1995 | Moroto et al. | |
| 5,545,964 A | 8/1996 | Stephenson et al. | |
| 5,652,493 A * | 7/1997 | Hendershot, Jr. | 318/701 |
| 5,703,421 A * | 12/1997 | Durkin | 310/61 |
| 5,727,560 A | 3/1998 | Ogura | |
| 5,969,454 A | 10/1999 | Pengov et al. | |
| 5,973,431 A * | 10/1999 | Li et al. | 310/168 |
| 6,046,568 A * | 4/2000 | Pengov | 318/701 |

(Continued)

*Primary Examiner* — Thanh Lam
(74) *Attorney, Agent, or Firm* — Ohlandt, Greeley, Ruggiero, Ruggerio & Perle, LLP

(57) ABSTRACT

A compact, rugged, variable reluctance, variable speed, electric motor capable of producing high torque at high electrical energy conversion efficiencies is provided. The present invention provides for a multi-stage motor design having a number of discreet rotor and stator elements on a common shaft. This configuration provided the simplest of magnetic structures and produces a powerful magnetic flux modeling design technique that is used to further optimize the motor design and subsequent control logic. Thermal mapping of the magnetic mass provides for advanced cooling techniques that are used to insure long in-service life in the most extreme of industrial applications. The electric motor inherently provides low vibration thereby greatly reducing noise; low turn to turn voltage potential thereby eliminating costly phase to phase shorting potential; efficient motor operation through the reduction in switching and copper losses in both the machine and its control.

8 Claims, 21 Drawing Sheets

U.S. PATENT DOCUMENTS

| | | | |
|---|---|---|---|
| 6,114,789 A * | 9/2000 | Pengov et al. | 310/166 |
| 6,153,956 A | 11/2000 | Branecky | |
| 6,300,693 B1 | 10/2001 | Poag et al. | |
| 6,509,710 B2 | 1/2003 | Grasso et al. | |
| 6,617,746 B1 | 9/2003 | Maslov et al. | |
| 6,762,524 B2 | 7/2004 | Six | |
| 6,815,848 B1 | 11/2004 | Glew | |
| 6,864,658 B1 | 3/2005 | Torrey et al. | |
| 6,897,584 B2 | 5/2005 | Doherty et al. | |
| 6,927,524 B2 | 8/2005 | Pyntikov et al. | |
| 7,009,360 B2 | 3/2006 | Jin-Woo et al. | |
| 7,049,716 B2 | 5/2006 | Gruendl et al. | |
| 7,091,635 B1 | 8/2006 | Gilliland et al. | |
| 7,156,195 B2 | 1/2007 | Yamagishi et al. | |
| 7,193,342 B2 | 3/2007 | Casey et al. | |
| 7,230,361 B2 | 6/2007 | Hirzwl | |
| 7,244,110 B2 | 7/2007 | Hong et al. | |
| 7,250,734 B1 | 7/2007 | Iannello et al. | |
| 2002/0047447 A1 * | 4/2002 | Torok et al. | 310/181 |
| 2005/0099082 A1 | 5/2005 | Nashiki | |
| 2005/0162031 A1 | 7/2005 | Torok | |

* cited by examiner

Where the following MSRM performance terms are defined:

($\grave{\omega}_{Base}$) - MSRM Base Speed     ($\Delta T''_{S,Rtd}$) - Rated Starting Torque
($\grave{\omega}_{Max}$) - Maximum Speed     ($\Delta T_{S,Max}$) - Maximum Starting Torque
($\grave{\omega}_P$) - Peak Torque Roll-off     ($m_T$) - Maximum Starting Torque

MULTISTAGE VARIABLE RELUCTANCE MOTOR/GENERATOR

CROSS-REFERENCE TO RELATED APPLICATIONS

The present application is a continuation of U.S. patent application Ser. No. 12/311,380, filed on Oct. 30, 2009, now U.S. Pat. No. 8,138,652 which claims priority of Application Serial No. PCT/CA2008/001503, filed on Aug. 22, 2008, and benefit of U.S. Provisional Ser. No. 60/957,914 filed on Aug. 24, 2007, the entire contents of which are incorporated by reference herein.

FIELD OF THE INVENTION

The present invention relates to the field of variable speed electric motors. The present invention more particularly relates to the design, construction, cooling and control of multi-stage variable reluctance machines operating efficiently, both as high torque electric motors and as efficient current generators.

BACKGROUND OF THE INVENTION

The present invention relates to the construction of electro-mechanical devices, most commonly known as switched reluctance motors. These motors can translate electrical energy into power and torque through the use of electromagnetic structures built around a fixed stator and an internal rotating rotor. In general, the stator of the prior art is generally comprised of a plurality of discreet lobes or poles, which extend inwardly towards the rotor. The associated rotor is also constructed of magnetic materials having a plurality of discreet poles that are constructed to extend outwardly toward the stator poles. To ensure self-starting, the object of the switched reluctance motor design is to ensure that one stator pole always overlays one rotor element, resulting in the need to have a different pitch between the number of stator and rotor poles.

Energizing in sequence the electromagnetic coils associated with each opposing pair of stator pole during each energizing cycle, creates a magnetic field that will draw an appropriately positioned rotor pole into alignment with one of the energized stator poles creating rotation and torque. As a consequence of having only one pole pair in the correct position at any given time (due to the different pitch between the number of stator and rotor poles) during the energizing sequence, relatively low torque is available. Manufacturers therefore will normally oversize switched reluctance motors relative to their steady-state operation performance leading to structural distortion of the motor casing, vibration, noise, large torque ripple effects in the torque output of the machine and low motor efficiency throughout the motor's operating range.

U.S. Pat. No. 5,365,137 of Richardson et al. identifies an arrangement incorporating an equal number of stator and corresponding rotor poles which can all be energized simultaneously for purposes of generating higher motor torque without the excessive torque ripple and distortion of the motor casing commonly found with other designs. With this arrangement, the motor is divided into a plurality of segments or stages, with each stage having successive rotor poles angularly displaced to permit self-starting. By energizing all of the stator poles within a stage and having each stage energized in sequence, the motor is inherently self-starting resulting in producing higher torque, lower torque ripple, less vibration and noise.

Other prior art includes U.S. Pat. No. 5,969,454 which illustrates rotor sections which are angularly offset.

Other rotary electric motor arrangements are shown in U.S. Pat. Nos. 6,927,524, 6,762,524, 6,617,746, 5,433,282, 5,727,560, 5,365,137

Switching circuits are shown in U.S. Pat. Nos. 5,115,181, 5,404,091, 5,012,177

U.S. Pat. Nos. 5,545,964 and 4,143,308 show control systems and methods of controlling a switched reluctance generator. U.S. Pat. No. 7,009,360 discloses a method of controlling a switched reluctance motor. U.S. Pat. No. 6,509,710 relates to a switched reluctance motor which is controlled by signals indicating the angular position of the rotor. U.S. Pat. Nos. 7,250,734 and 6,864,658 also illustrate a method of controlling a switched reluctance machine.

U.S. Re. 31,950 discloses that the pole shoes are skewed in relation to the rotor axis. Moreover, U.S. Pat. No. 4,670,696 illustrates laminated rotors which are skewed along the axial length of the rotor relative to its axis of rotation.

Cooling systems for switched reluctance motors are disclosed in U.S. Pat. Nos. 7,049,716, 7,193,342, 6,815,848, 7,244,110, 7,156,195, 6,897,584, 7,091,635, 6,300,693, 5,372,213, 2,824,983, 3,663,127, 3,518,468, 4,743,176 and 5,222,874.

U.S. Pat. No. 6,153,956 discloses circuitry which includes a first calculating means which includes a look-up table wherein the look-up table provides a relationship between the reference flux linkage value, the phase current and the shaft angle.

U.S. Pat. No. 7,230,361 relates to a method for determining a design of electrical devices based on an analysis of key design equations which permits design of an axial airgap machine with optimized torque at a given speed.

U.S. Publications 2005/0162031 and 2005/0099082 illustrate poles that are skewed or circumferentially displaced.

The present invention addresses the need for a motor/generator that produces higher torque, lower torque ripple, less vibration and noise while incorporating improved design techniques to optimize the arrangement, construction, performance, control and cooling.

SUMMARY OF THE INVENTION

It is an object of this invention to provide an improved multi-stage variable reluctance motor/generator, and method for producing and designing same.

It is an aspect of this invention to provide a multi-stage, variable reluctance device comprising a shaft having an axis of rotation; a plurality of spaced stages disposed about said axis of rotation, each stage having an equal number of stator and rotor poles defining stator and rotor pole pairs, symmetrically disposed about said axis of rotation, and having an airspace therebetween; means for energizing all stator poles of one of said stages at the same time for a selected time interval; means for sequentially and repeatedly energizing all stator poles of said other stages, where each stator and rotor pole pairs in a stage have substantially the same physical, magnetic and electrical characteristics.

It is another aspect of this invention to provide A method for enabling the selective production of multi-stage variable reluctance motor/generators having a plurality of spaced stages about an axis of rotation, where each stage has an equal number of stator and rotor poles defining stator and rotor pole pairs symmetrically disposed about the axis of rotation and having an air space therebetween, comprising: selecting a single stator and rotor pair for each stage; determining for said single stator and rotor pair, criteria selected from the group of physical, magnetic and electrical characteristics for said single stator and rotor pair in such stage; producing all of said stator and rotor poles in such stage from said criteria from said single stator and rotor pair.

A further aspect of the invention relates to a system for optimizing physical, magnetic and electrical characteristics of a multi-stage variable reluctance motor/generator having a plurality of spaced stages about an axis of rotation where each stage has an equal number of stator and rotor pairs defining stator and rotor pole pairs symmetrically disposed about said axis of rotation, and having an airspace there between comprising: storing in memory a representation of a single stator and rotor pair for each stage; computing for said single stator and rotor pair criteria selected from the group of physically, magnetic and electrical characteristics for said single stator and rotor pair, determining all of the stator and rotor poles in said stage from said computing step.

It is an aspect of this addition to the invention to provide a variable torque device comprising modifications to the wiring of the windings so as to increase the low speed torque output and base speed operating characteristics of the invention. It is another aspect of this invention to provide magnetic and electrical characteristics of the coils within each stage of the invention so as to maximize the low speed torque output of the device, while enhancing the base and high speed performance characteristics of the device.

The present invention provides additional benefits in design technique, construction, control and performance over conventional multi-stage switched reluctance motor devices. Building on a motor having a plurality of stages, with the rotor and stator sections of each stage arranged with an equal number of poles, the invention utilizes advanced design techniques to optimize the arrangement, construction, performance, cooling and control of the invention. The simplicity of the invention and its associated electromagnetic structure allows for the development of a specialized and highly advanced computer modeling design technique to both optimize the design elements of the invention and to accurately predict machine performance over a wide variety of design needs. The advantage of the invention design technique resides in the ability that each component of the invention can thereby be accurately modeled as to its physical, electrical, thermal and magnetic properties so that the overall performance of the invention can be optimized for each application.

Accordingly, the invention incorporates a series of advancements in its construction that both reduce its overall complexity while significantly improving its torque producing capabilities and overall operating efficiencies. The invention employs a multiplicity of stages, each stage having stator and rotor sections with an identical number of poles, wherein individual stage stator poles and corresponding stage rotor poles form individual pole pairs that are all in identical alignment. In contrast with the Richardson Patent, the invention contains a number of significant construction improvements. The stator section of each stage is formed from a laminated magnetic element forming both the back iron and the pole structures of the stator section. In one preferred embodiment, the stator section of each stage comprises a monolithic annular laminated stator section. The electromagnetic coils affixed to each stator pole are simple machine wound devices that are capable of being mass-produced and easily assembled within the machine.

As the coils affixed to the stator poles of each stage are energized in unison, the electrical power distribution within the machine is simple and straight forward. The invention further reduces the sizing of the electrical power distribution system within each stage by splitting the power supply into two halves with each branch feeding a portion of the electrical energy to a portion of the allotted number of coils per stage. During operation, the voltages in adjacent coils in a given stage are identical; therefore, there is no potential for a short between adjacent coils as is common with other electric motor arrangements. The stator construction particular to the invention provides for a smaller, simpler and lighter weight construction than is the case in the Richardson Patent. As well, the construction of the invention stator provides for a more effective means for the removal of heat from the device, which in turn adds to the compactness of the invention.

Each rotor stage of the invention is also formed from a laminated magnetic element containing the outwardly directed pole structures and shaft connection means as required by the performance characteristics of the machine. In a preferred embodiment, each rotor stage comprises an annular monolithic laminated magnetic element. The rotor poles of each stage are radially displaced, one stage to the other along the axis of the invention thereby insuring that at any time, at some combination of plurality of stages and stage rotor pole displacement angles, one stage of rotor poles will be correctly aligned with its corresponding stage of stator poles forming a multiple of air gaps between the stage pole pairs such that when the stator coils are energized, a local magnetic circuit is completed drawing all of the correctly aligned rotor stage poles into alignment with the corresponding stator stage poles resulting in rotation of the rotor assembly and the transfer of torque to the rotor shaft. Once in rotation, successive stages will be in correct mechanical alignment to permit the electric power supply control algorithm and electric circuitry elements of the present invention to advance the electrical energy to the next stage of the invention to insure a smooth and continuous transfer of torque and rotational motion to the rotor shaft in a stage-to-stage manner. Conversely, the correct alignment of the stage pairs when rotated by an external mechanical energy source, combined with a simultaneous low level energizing voltage applied to the corresponding stator rotor coils will result in a magnetic field being established between the pole pair which will result in the generation of a much larger current in the stage stator rotor coils, which when combined with the current produced from each successive stage of rotor coils will result in a continuous power generation capability as long as the external mechanical power is applied to the rotor shaft.

Particular to the present invention is the skewing of the stage rotor poles along the axis of rotation of the individual rotor poles of each stage. In the course of assembly on a custom assembly jig, each successive lamination that in total number make up the magnetic mass of each rotor stage, the laminations are displaced radially one to the other such that the totality creates a skew of the stage rotor poles. In skewing the rotor poles at an angle to the stator poles, an overlap is created in the air gap between the stage pole pairs causing a more gradual decrease to the reluctance in the air gap between the pole pairs on transferring energy to the individual stage stator poles than is found with a parallel alignment of the stage stator and rotor pole pairs. In a similar manner, a gradual tapering off of the reluctance energy in the air gap is created as the stage rotor poles leave the influence of the magnetic fields of the corresponding energized stage stator poles. In operation the skewed rotor pole angles demonstrate a further reduction in the energy levels of the torque ripple/current ripple created when shifting the electrical/mechanical energy from one stage to the next.

The radius of the rotor, the number of poles, the length of the poles, the width of the poles, the thickness of the back iron, the number and thickness of the laminations, the size and shape of the electromagnetic coils are all determined by the invention design techniques. Input to the design technique includes, but is not limited to: desired output torque/current, desired motor/generator speed range, size limiting spatial constraints, input/output voltage, input/output current.

The construction of the present invention permits the design of efficient machine cooling assemblies as the majority of the energy losses associated with the invention occurs in the stator and stator windings. A support casing constructed of lightweight, high strength, high thermal conductivity material is intimately and thermally bonded to the stator. Depending upon the particular service or use envisioned for the invention, one of the invention cooling systems can be chosen which best suits the service, and includes, but not limited to: forced air cooling; pressurized liquid cooling; pumped internal spray cooling; etc.

For larger applications, the machine casing of the present invention allows further improvements over the U.S. Pat. No. 5,365,137 patent, in that the invention casing permits the inclusion of internal bearings within the structure to allow for the development of much higher torque/current outputs with smaller diameter support shafts that would have possible heretofore. The inclusion of internal bearings between the stages of the inventions provide for the production of high torque/currents from larger machine structures than was possible with the prior art.

Efficient operation of the invention requires the accurate timing and control of electrical energy delivery to/from each stage of the invention; in controlling the timing duration and amounts of electrical energy delivered to/from each stage of the invention, the reluctance of the invention can be infinitely varied to produce both the speed and the torque/current 20 output specific to the design use. Variables such as rotor radius, stage length, coil sizing and cooling method can all be varied in the design technique to vary the size, performance and efficiency of the invention as applied to specific applications. In addition, the invention design technique can be made to replicate the timing and power input/output of the electrical energy in order to optimize the control logic and the design of the electrical controls associated with the invention. As part of the design technique of the invention, a particular control algorithm has been developed which provides the logic necessary to control the motor/generator efficiency by means of a dynamic bus voltage; speed and torque/current output by means of firing angle prediction in "real time" operating mode.

This arrangement of the invention, results in a self-starting device that exhibits a balanced reaction of motor torques into the motor casing; however this invention contains embodiments of design techniques, construction and control which exhibit simpler construction, smaller size, lighter weight, higher torque output, higher efficiencies, lower volume/power ratios, lower cost/power ratios and lower torque ripple when used in its comparable motor configuration then the previous embodiment. The electric power control portion of the invention further advances prior art in that it will allow the invention to be instantly converted into an efficient electrical energy generation system upon the application of power to the rotor shaft.

BRIEF DESCRIPTION OF THE DRAWINGS

A detailed description of one or more embodiments is provided herein below by way of example only and with reference to the following drawings, in which.

Figure 1:
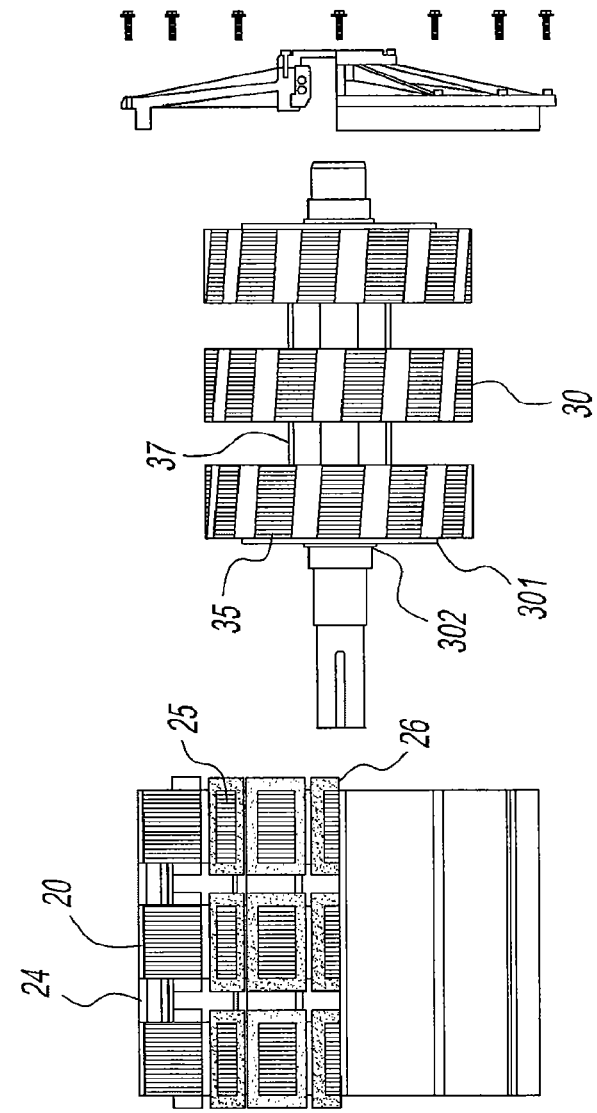
FIG. 1 is an exploded view of the invention and illustrates the key components of a three-stage version of the present invention.

In the drawings, one or more embodiments of the present invention are illustrated by way of example. It is to be expressly understood that the description and drawings are only for the purpose of illustration and as an aid to understanding, and are not intended as a definition of the limits of the present invention.

DETAILED DESCRIPTION OF THE INVENTION

The present invention will be further understood by reference to the following non-limiting example.

Referring to the drawings that are provided to illustrate preferred embodiments of the invention only, and not for the purpose of limiting same, FIGS. 1 to 5 illustrates a version of the invention, which having motoring/generating capabilities is suitable for use as a traction motor in large transport vehicles such as automobiles, highway and off-road trucks, buses, mobile mining equipment, marine propulsion systems, locomotive propulsion systems in which regeneration is a positive design attribute to reduce the energy consumption of these drive systems. As heavy duty industrial motors only, the invention can find a multiple of uses in such heavy duty service as pump drives, compressor drives, conveyor drives; while as heavy duty generators only the invention will be ideally suited for use in wind turbines, exhaust turbo generators, water turbines, stand-by power generation and the like. It should be appreciated however, that these uses are merely examples of a multitude of particular applications in which the motor, motor/generator or generator capabilities of the present invention may be employed.

Figure 2:
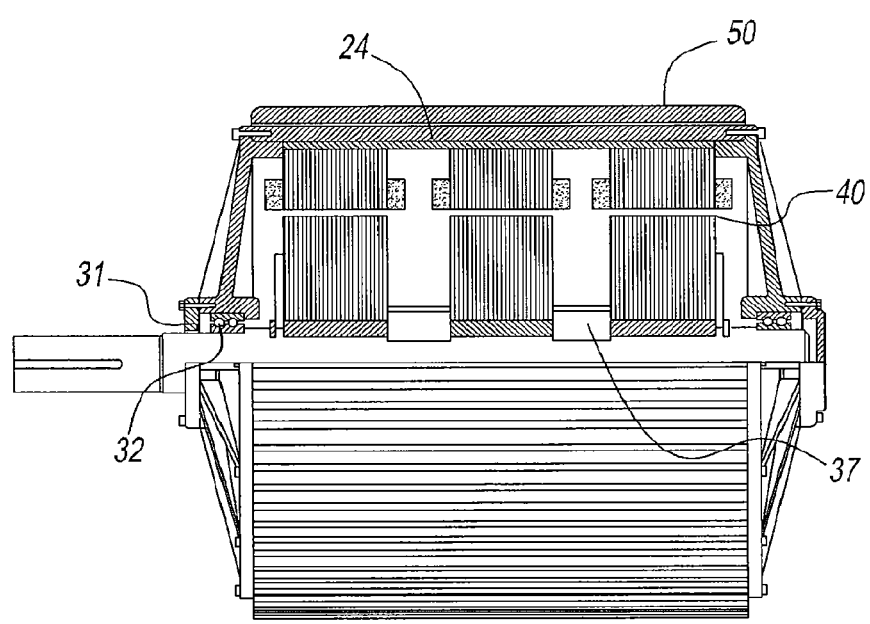
FIG. 2 is a longitudinal view and section of the invention and illustrates the elements of FIG. 1 in an assembled state.

As illustrated in the exploded view of FIG. 1, one embodiment of the mechanical portion of the invention namely the machine or multiple stage, variable relevance motor/generator device 10 comprises a stator, a rotor assembly and casing 50. The stator includes a plurality of segments, stages or constructions. The rotor assembly includes a plurality of segments, stages or structures. In the embodiment illustrated in FIG. 1, three separate stator constructions 20, along with three separate rotor structures 30 are formed usually, but not necessarily always, from thin laminations of magnetic material each separated by a thin, non-conductive coating used to limit the magnetic "leakage" and conductivity between the laminations. The rotor is formed with a plurality of electromagnetic rotor poles 35 which correspond to a similar number of stator poles 25 over which are tightly fitted electromagnetic coils 26. In the preferred embodiment these electromagnetic coils 26 may be coated with copper transformer wire that can be machine wound, insulation wrapped and varnished to the exact size and shape of the particular machine stator pole 25. The radial pole faces of the stator poles 25 and rotor poles 35 when assembled as shown in FIG. 2 are separated by a radial air gap 40, the size and shape of which is determined through the use of the design technique associated with this invention, and described below.

The machine 10 as shown in FIGS. 1 to 5, is an improvement over the motor detailed in U.S. Pat. No. 5,365,137 of Richardson et al., the disclosure of which is expressly incorporated herein by reference. Specifically, the present invention is an improvement of the motor referenced in the U.S. Pat. No. 5,365,137 patent in a number of ways in that it provides for a simpler construction of the stator elements thereby decreasing the size and complexity of the machine 10; it provides for the generation of power from the same device with the application of an external mechanical driving force; it provides for reduced torque ripple, vibration and noise with the introduction of skewed poles 39 on the rotor 30; it provides for alternate cooling systems of the device with the use of jacketed casings 50 as well as the direct application of coolants to the internals of the machine 10; it provides for internal bearings 32 which in turn allows for the development of larger machines than was previously possible. These improvements will be further discussed herein.

The rotor shaft 36 is supported by means of bearings 32 and seals 31 fixed in the machine casing 50, which also supports and fixes the spatial relationships between: the stator structures 30 and stator pole winding coils 26; stage to stage spacing (i.e., the spacing between adjacent stator constructions 20 or spacing between adjacent rotor structures 30) bearing locations—both internal and external as shown. In addition the device casing 50 supports the stator stages and stator windings concentrically and without distortion under operation. The rotor assembly is disposed concentrically about shaft 36. The casing 50 is concentrically mounted relative to shaft 36, thus maintaining the air gap between the stator and rotor poles. Spacer bars (not shown) are employed during the machine assembly to insure spacing between the respective stator stages 24 as well as between the respective rotor stages 37. End plates 301 held in place on the shaft by split rings 302 maintain the rotor spacing with respect to the motor bearings.

Figure 3A:
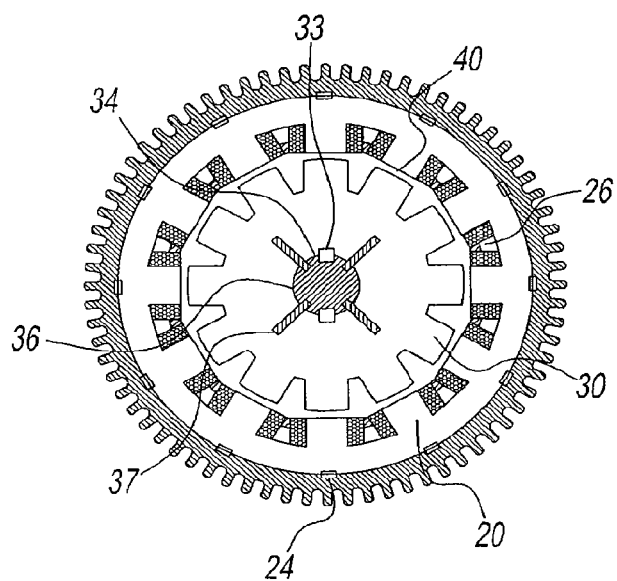
FIG. 3(a) is a cross sectional view of one of the stages and illustrates the key components of the invention.
Figure 3B:
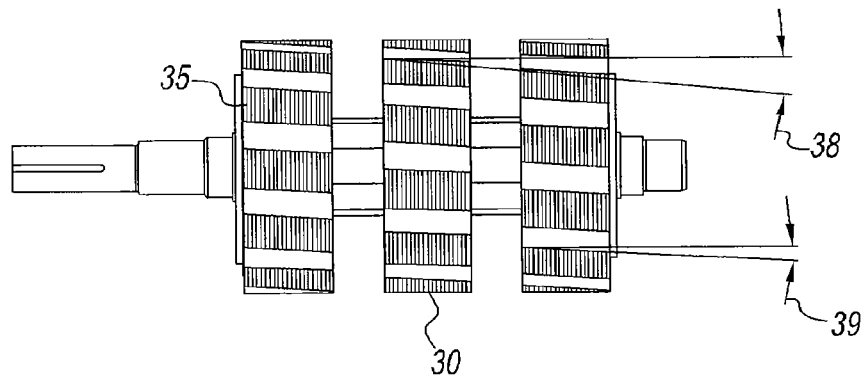
FIG. 3(b) is a plan view of the three-stage rotor and illustrates the alignment of the rotor stages one to the other as well as the skewing of the rotor poles relative to the rotational axis of the invention.

FIG. 3(a) shows how each rotor structure 30 is fitted to a concentric shaft 36 by means of two keyways 34 machined into the shaft material and held from rotating around the shaft by means of keys 33 sized to allow the efficient transfer of torque produced to the operation of the invention. FIG. 3(b) illustrates that each rotor stage 37 has a corresponding indexed keyway to allow for the offset 38 positioning of the rotor stages onto the shaft with their poles indexed around the rotational axis of the invention. The offset is measured as the radial difference or offset between corresponding positions of adjacent rotor poles 35. The offset is shown as angle 38 in FIG. 3(b). Shown for reference also is an embodiment of a rotor pole 35 arrangement having a "skew" angle 39 applied to each individual rotor pole 35 in relation to axis 36 of the machine 10.

The rotor offset depends on the number of pole pairs and stages chosen. As shown in the drawings the rotor offset is 10 degrees. Also the rotor skew is variable and as shown in the drawings is between 3 to 5 degrees.

Figure 3C:
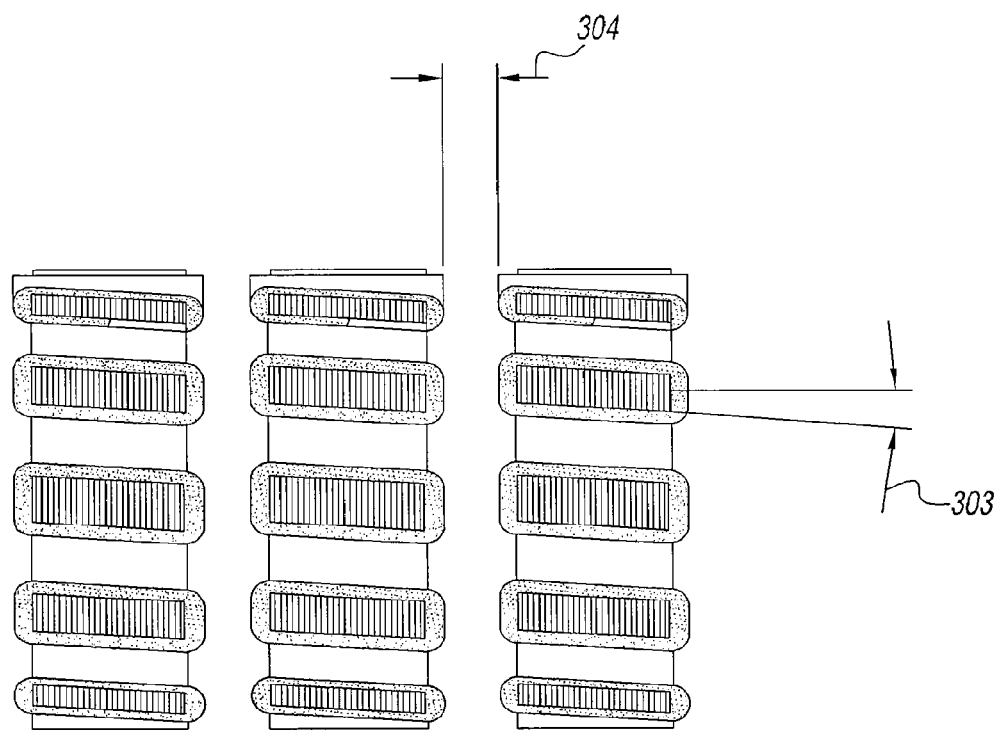
FIG. 3(c) is an enlarged plan view of the three-stage rotor and illustrates offset stator stages and the stator stage air gap in the axial direction.

Another embodiment of the invention showing that the machine 10 may, or may not, have the individual stator poles 25 skewed 303 is shown in FIG. 3(c)

Figure 3D:
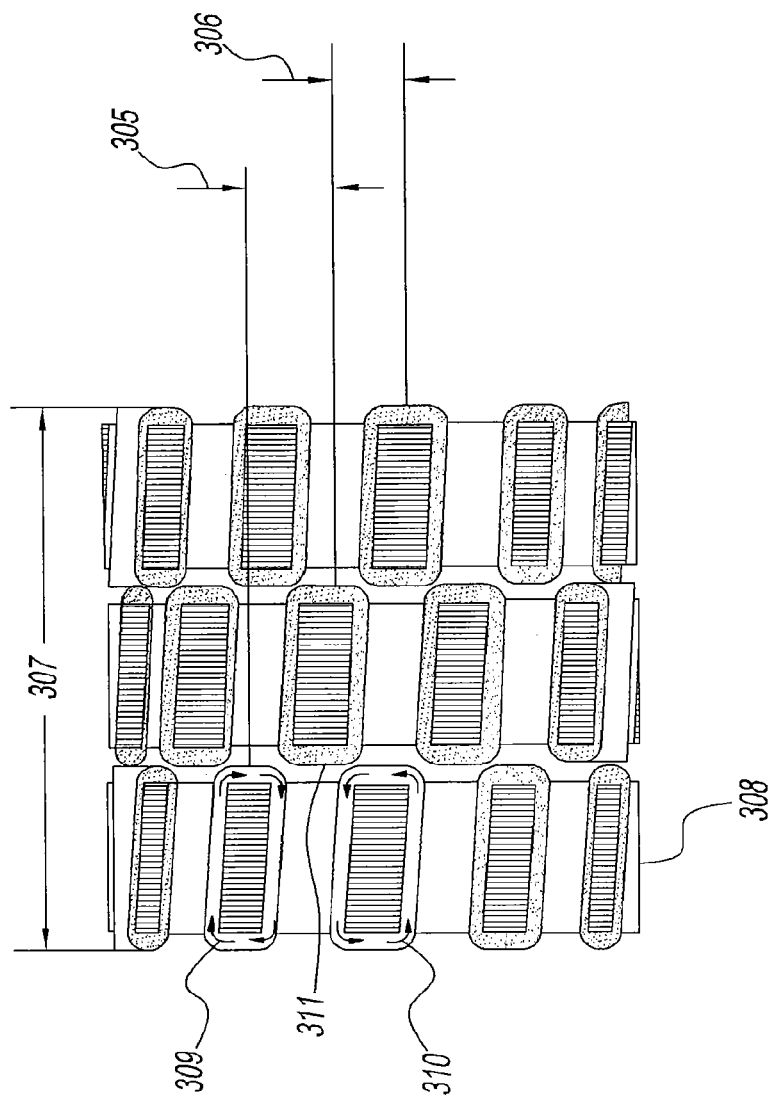
FIG. 3(d) is an enlarged plan view of a further embodiment of the three-stage rotor and illustrates individual stator poles that are radially offset in relation to each other.

FIG. 3(d) illustrates a further embodiment of the invention wherein the individual stator poles 25 are radially offset 305, 306 in relation to each other as between individual stator stages 24 of the machine 10 in a manner corresponding to the offset for the rotor pole offset 38 described above. By offsetting the stator stages 24, the stator stage air gap 304 in the axial direction as depicted in FIG. 3(c) can be significantly reduced compared to the prior art thereby reducing the total stator length 307 (i.e., all stator segments) which in turn reduces the overall length of the machine 10. In other words the stator poles 25 or one stator stage is offset, so as to be disposed generally between adjacent stator poles 25 on the adjacent stator stage 24. Stacking of the stator stages 24 in this manner can only be accomplished by offsetting 38 the rotor poles 35 between each rotor stage 37; as the current in each adjacent pair of stator coils in the energized stator 308 is travelling in opposite directions 309, 310. Since the current is travelling in opposite directions, this reduces the possibility of a current being induced in the non-energized stator coil(s) 311 in the adjacent stator stage 24.

The stator offset is dependant upon the number of pole pairs and stages chosen. As shown in the drawings the stator offset is 18 degrees, but other offsets can be chosen. Also the stator skew is variable and as shown is between 3 to 5 degrees.

Figure 4:
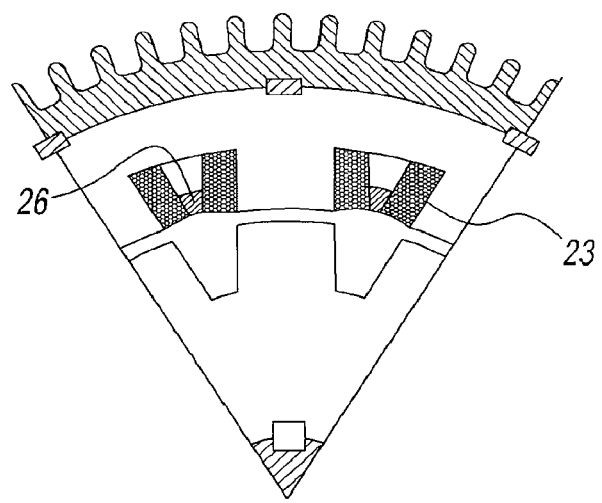
FIG. 4 is enlarged cross section of a rotor pair illustrating fabrication elements of the stator coil assembly.
Figure 5A:
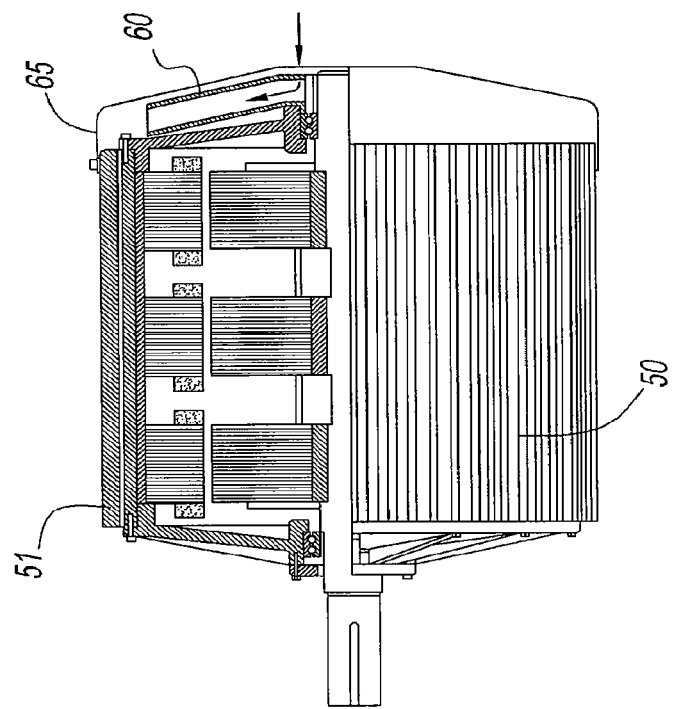
FIGS. 5(a) to 5(c) illustrates some, but not all of the cooling embodiments available for use with optional machine casing designs.
Figure 5A:
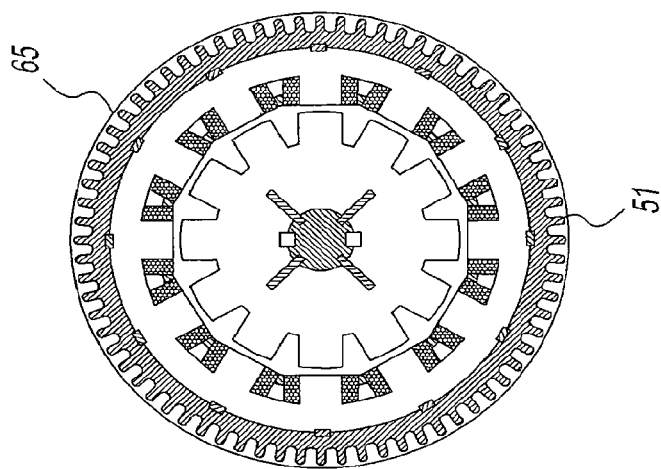
Figure 5B:
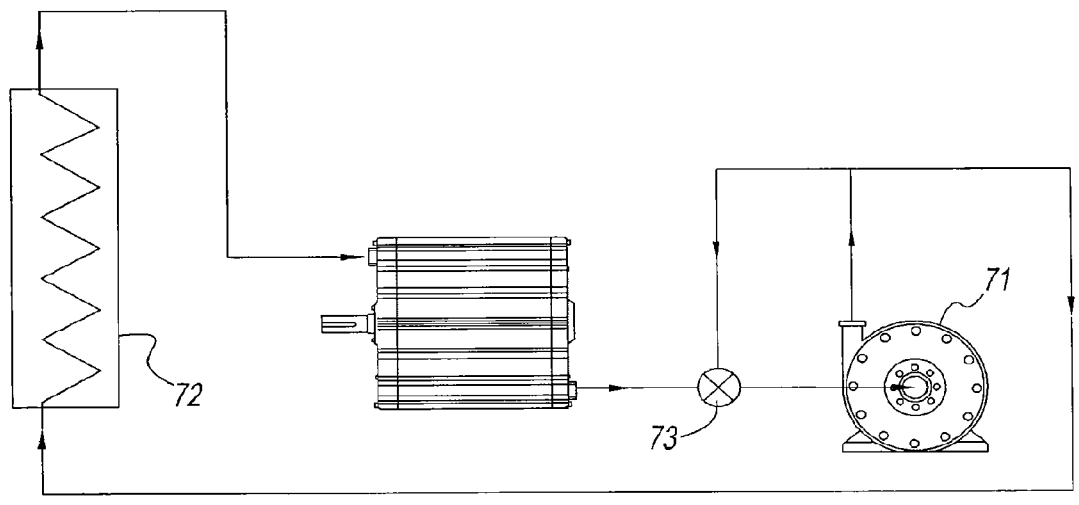
Figure 5B:
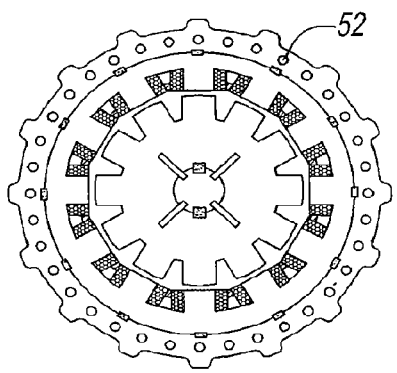
Figure 5B:
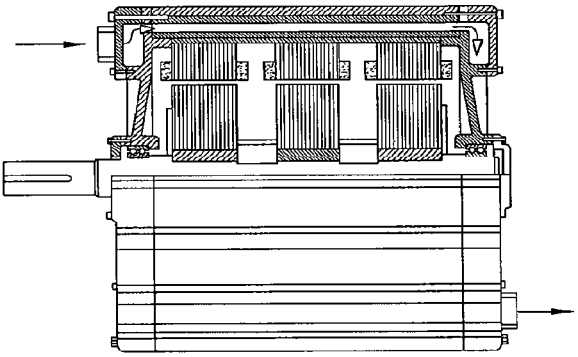
Figure 5C:
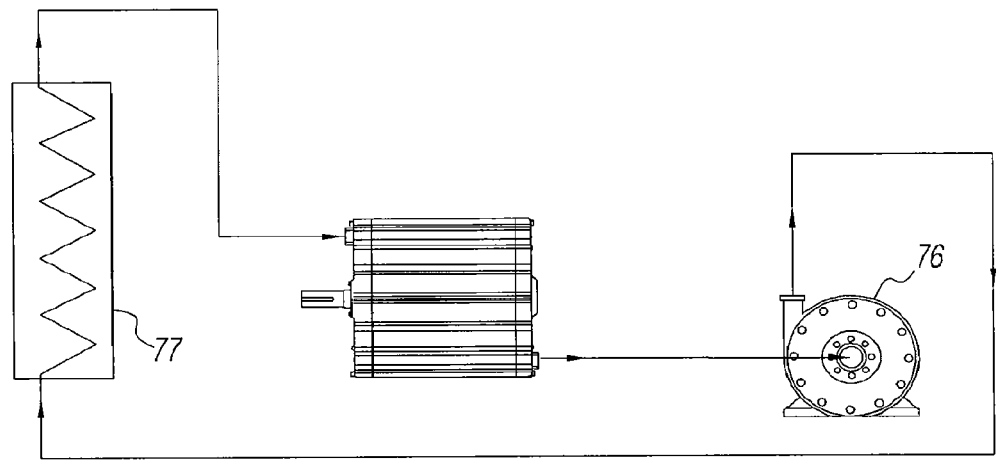
Figure 5C:
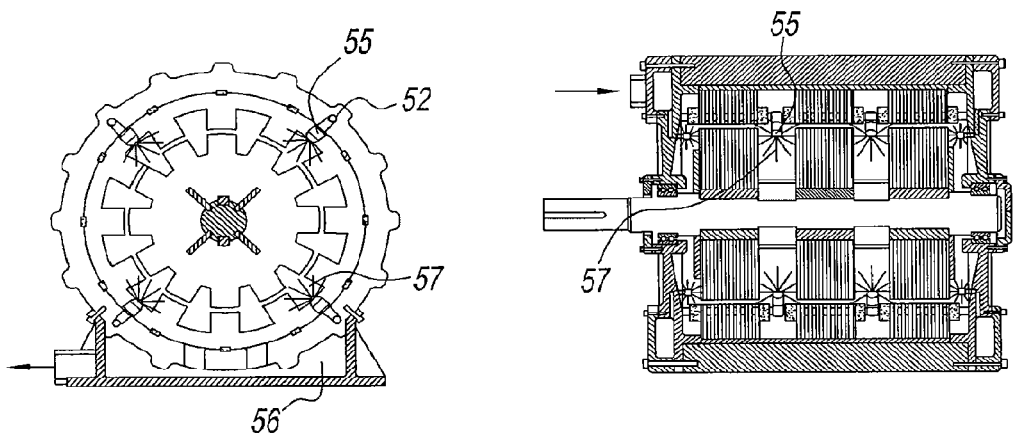

As shown in FIG. 4 a plurality of wedges 26 (for example, moulded of phenolic resin) are forced between adjacent coil bundles 26 to fix the coils 26 in position over the stator poles 25. A Dacron™/Mylar™/Dacron™ insulation layer 23 is fitted between the coil windings 25 and the stator 20 and stator poles 25 in order to prevent damage to the coil insulation from the possibility of contact with the stator 20 metal. When assembled the complete stator assembly is dipped in a varnish.

Motor/Generator Cooling

A preferred embodiment of the present invention incorporates a motor/generator machine casing 50 formed of heat conducting material intimately and thermally connected to the machine stators 20 and comprising a number of heat removal strategies described as follows:

FIG. 5(*a*) illustrates the air-cooled embodiment of the machine casing 50 showing the external cooling fins 51 used to increase heat transfer from the machine stator constructions 20 to the ambient air. In the air-cooled embodiment shown, the fins 51 are enclosed in a shroud 65 and air is forced through the resulting internal spaces or passages between the fins 51 and shroud 65 by a fan 60. The shroud 65 is mounted on the motor shaft. The fins 51 further assist in convective and radiation cooling from the casing 50 surface which in turn cools the machine 10.

FIG. 5(*b*) illustrates the machine casing 50 with internal cooling passages 52 which allows the use of liquid coolant to more effectively remove the stator 20 heat losses by conduction through the housing assembly and associated pressurized liquid cooling circuit 70 having a liquid recirculation pump 71 and air to liquid heat exchanger 72. The operating temperature of the invention can be maintained at a predetermined set point by means of an inline thermostat 73.

FIG. 5(*c*) illustrates the addition of spray nozzles 55 into the liquid coolant passages of the machine casing 50, which are employed to further remove heat by conduction and/or evaporation from the machine internals. Associated with the internal coolant spraying nozzles 55, a sump 56 is provided from which the collected sprayed coolant 57 condensation or vapours can be pumped from the machine casing through an associated liquid or vapour cooling system 75 having a liquid/vapour recirculation pump 76 and heat exchanger/condenser 77.

Figure 6:
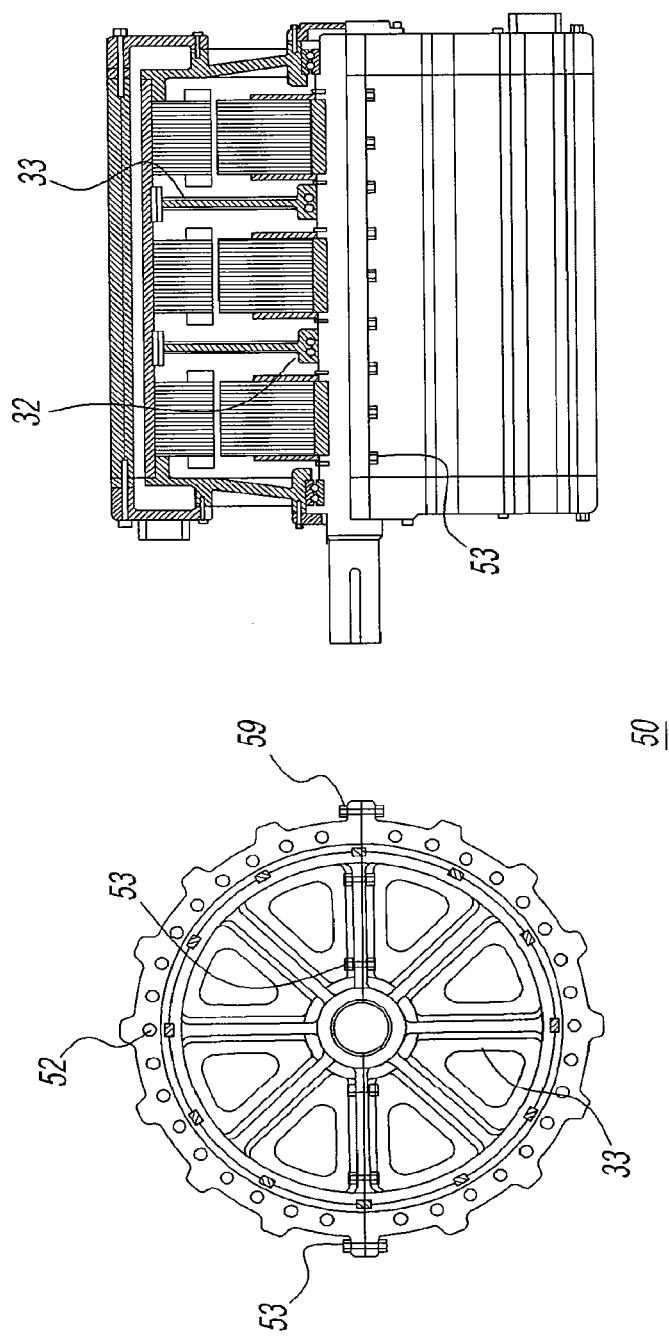
FIG. 6 illustrates an embodiment of the machine casing having internal bearings.

With reference to FIG. 6 and the machine casing 50, a further improvement to the prior art is shown with the introduction of internal bearings 32 for use in larger machine sizes. The internal bearings 32 are intermediate the ends of the device 10. In this embodiment of the machine casing design, a split casing 59 is illustrated with the liquid cooling channels 52 shown. The split casing allows for the efficient inspection, removal/replacement of the internal bearings; the bearing support 33; and the casing bolts 53 insure the structural integrity of the machine once assembled and torqued to design specifications. One end of the internal bearing support 33 is connected to the casing 59 while the other end carries the internal bearings 32 contacting the shaft 36.

Motor/Generator Power Feed

Figure 7:
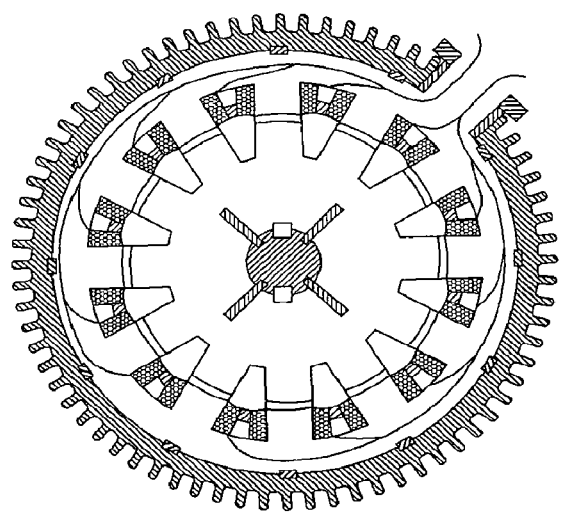
FIG. 7 is a cross sectional schematic of one of the stages of the invention and illustrates the electric power cabling to each stage of the invention.

FIG. 7 illustrates the main power feed 22 to each stator stage 24 split into two halves, each half of which services opposite stator poles 25 in a given stator stage 24. This improvement allows for the reduction in electrical conductor size within the machine casing 50, as well as eliminating the "circulation" of the back EMF currents after each power down episode related to the control of power to/from each stator stage.

Motor/Generator Modelling

As the present invention has a plurality of potential uses, and the exact performance specifications for each use (motoring and/or generating) cannot be presupposed, it was necessary to develop a reliable method of determining critical motor design features that would be required to meet application specific performance requirements.

The method of modeling the performance of any configuration of the present invention includes defining the critical regions of operation. For example, if the invention would be used as a traction motor having a constant torque region and a constant power region, the base speed of the motor 10 could be defined as the intersection point of the two regions illustrated in FIG. 8(*a*). From FIG. 8(*a*), the asymptotic response of the invention represents a linear decaying 'constant-torque' region followed by a constant power region. Specifically for Traction applications the invention is capable of delivering Peak Torque surges for very short durations; this is also represented in the Asymptotic Performance Map of FIG. 8(*a*).

The base speed of the invention represents the most efficient region of operation for both the machine and its electronic controlling device. Careful selection of this point is necessary for both machine performance and overall efficiency. The electro/mechanical design of this invention requires the determination or selection of the base speed at the desired torque (power) required for the specific application. The base speed can be selected anywhere in the torque vs. rpm plane referred to earlier. However as the base speed is moved further from the origin, the bus voltage requirements are increased, alternatively the bus voltage can be kept constant and the stage current increased while reducing the coil turns of the machine.

The maximum speed is defined by the region where the effective field weakening causes unpredictable machine performance. The operation of the invention should be limited to speed below that maximum speed.

As a general rule of thumb the maximum speed is defined by the relationship;

$$\omega_{Max} \leq \left(\frac{3}{2}\right) \cdot \omega_{Base}$$

In other words, the maximum speed is less than or equal to 150% of the base speed.

Figure 8A:
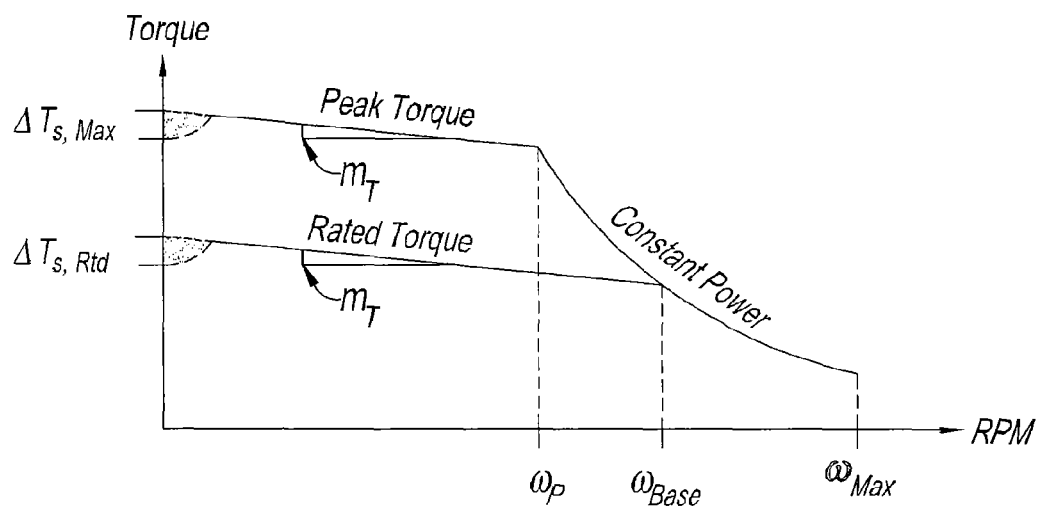
FIG. 8(a) illustrates an asymptotic performance map of the invention.
Figure 8B:
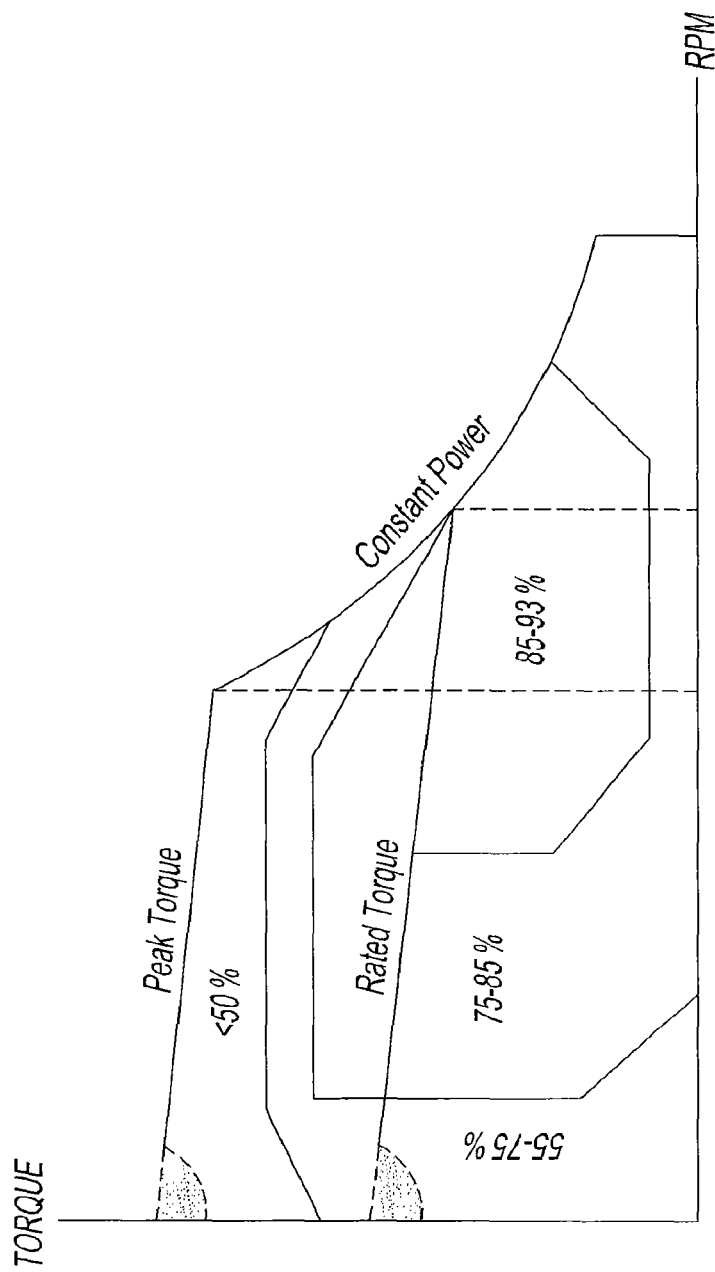
FIG. 8(b) illustrates combined systems efficiency map of the invention.

The peak torque roll-off is defined as the point of intersection RO (shown in FIG. 8(*a*)) between the 'constant peak torque' region and the constant power region of the invention being used in one of its configurations as a traction motor. Peak operation of the machine close to the 'knee' is sometimes not achievable due to the asymptotic roll-off of the torque within this region.

Extensive preliminary estimations of machine system performance for use as a traction motor has led to the generation of the Regions Of Efficiency Map, FIG. 8(*b*). Given that the predominant loss mechanism is the associated switching losses inherent with the electrical control circuitry, substantial effort was required to architect an appropriate electro/mechanical design that would minimize the respective losses within the machine's nominal operating envelope. Therefore a simple, relatively easy to use design tool was engineered for the design of specific embodiments of the present invention.

Baseline machine geometries were developed in a suitable modeling environment, by using simplified expressions for static torque production from which selected variables can be optimized to achieve desired machine performances.

The Fixed Variables of Design:
 Maximum Coil Current ($I_{Coil}$)
 Machine Outer Diameter ($R_{OD}$)
 Machine Driveshaft Diameter ($R_{SH}$)
 Number of Machine Poles ($N_P$)
 Machine Nominal Air-Gap Length (G)

The Variables Selected for Performance Optimization:
- Design Constants ($K_1$, $K_2$, $K_3$)
- Machine Stack Length (SL)
- Core Material Properties
- Bus Voltage ($V_{Bus}$)
- Coil Turns & Geometry (N, $X_{Coil}$, $Y_{Coil}$)
- Rotor Skew Angle ($\alpha_S$)

Figure 9A:
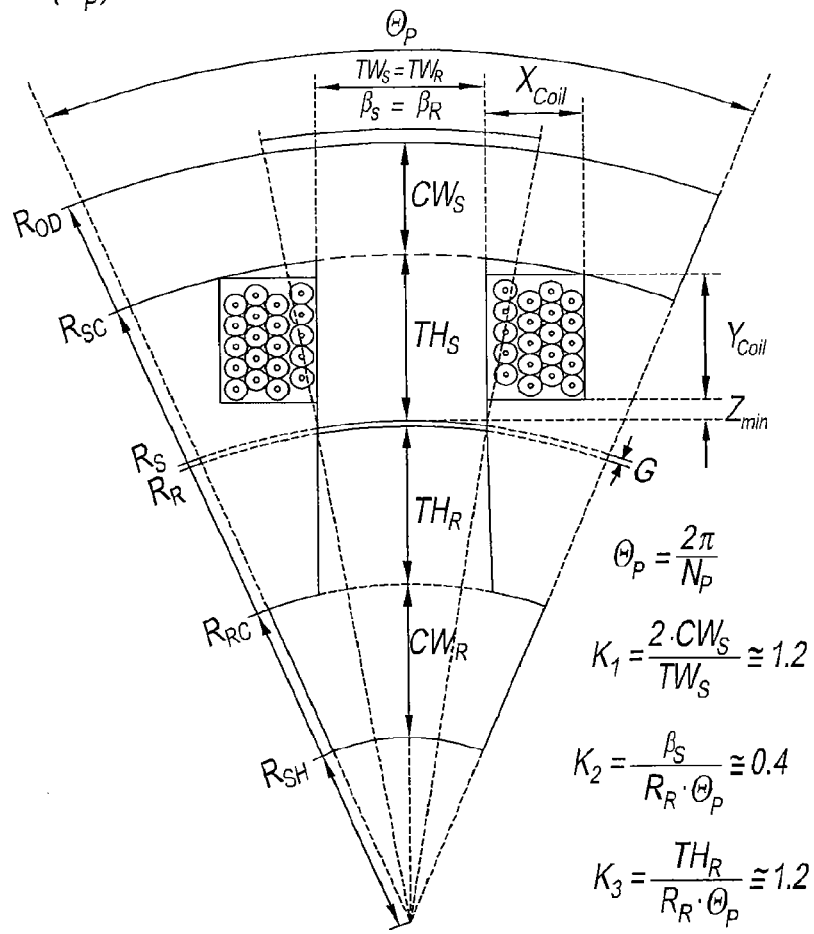
FIG. 9(a) illustrates an equivalent single pole pair model of the invention.

The Machine Performances to be Evaluated:
- Machine Torque Envelope & Roll-Off
- Maximum Starting Torque
- Machine Efficiencies
- Minimization of Controller Volt-Ampere Rating
- Machine Saturation Characteristics (Peak Operational Conditions)
- Machine Operating Temperatures Due to the inherent symmetry of the present invention each stage is completely independent and furthermore the Stage can be completely characterized by an equivalent single pole pair model, as shown in FIG. 9(a), since each stage has an equal number of stator and rotor poles, and each stage is sequentially energized.

In one embodiment, the coil design begins with the following defined parameters:
- RMS stage current: ($I_{Stage}$); Fixed
- Number of winding turns: (N); Variable Once a suitable RMS stage current ($I_{Stage}$) has been determined, the wire diameter and insulation thickness will be determined based on the operational environment of the specific machine, which will be represented by a single diameter ($D_W$).

Based on the air gap volume (defined as the total width of stator teeth and depth of stator teeth and distance between stator and rotor teeth) magnetic core properties, magnetic core geometry, desired maximum operational speed (function of bus voltage) and desired operating torques the baseline winding turns can be chosen (N). This variable will have one of the utmost dominance throughout the machine design; careful consideration will be necessary to fully evaluate the effectiveness of this specific parameter.

Figure 9B:
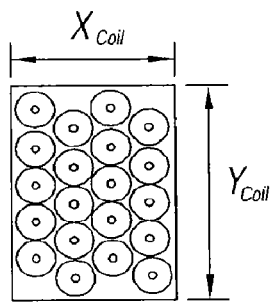
FIG. 9(b) illustrates a cross section of one leg of a stator coil.

The coil geometry, FIG. 9(b), is to be designed to maximize the contact area between the stator pole tooth while minimizing the overall distance from said tooth. Therefore the coil should tend to be rectangular in dimension with the $Y_{Coil}$ being the longest side, as illustrated.

Once the overall number of turns and the number of turns per layer has been determined the coil dimensions can be determined from the following relationships:

$$X_{Coil} = \lfloor (\text{Layer} - 1) \cdot \sin(60°) + 1 \rfloor \cdot D_W$$

$$Y_{Coil} = \left( \frac{\#\text{ Turns}}{\text{Layer}} + \frac{1}{2} \right) \cdot D_W$$

The stator lamination design begins with the following defined parameters:
- Stator Lamination Outer Radius: ($R_{OD}$); Fixed
- Number of Poles: ($N_P$); Fixed
- Maximum coil to stator pole tip clearance at center line: ($Z_{min}$); Fixed
- Coil Dimensions: ($X_{Coil}$, $Y_{Coil}$); Variable
- Ratio of stator core width to half stator pole width: ($K_1$); Variable
- Ratio of pole angle to pole pitch: ($K_2$); Variable The following equations are used to fully define the geometry of the stator lamination: NOTE: For the example shown, all dimensions are in centimetres (cm)

$$\beta_S = K_2 \cdot \Theta_P = K_2 \cdot \left( \frac{2\pi}{N_P} \right) \tag{1}$$

$$(R_{SC})^2 = \left( \frac{TW_S}{2} + X_{Coil} \right)^2 + (R_S + Z_{min} + Y_{Coil})^2 \tag{2}$$

$$\frac{TW_S}{2} = R_S \cdot \sin\left( \frac{\beta_S}{2} \right) \tag{3}$$

$$CW_S = K_1 \cdot \frac{TW_S}{2} \tag{4}$$

$$R_{SC} = R_{OD} - CW_S \tag{5}$$

$$TH_S = R_{SC} - R_S \tag{6}$$

Combining the above equations yields the following second order equation in terms of the stator radius ($R_S$):

$$A \cdot R_S^2 + B \cdot R_S + C = 0$$

Where the following variables are expressed in terms of known quantities:

$$A = 1 + (1 - K_1^2) \cdot \sin^2\left( \frac{\beta_S}{2} \right)$$

$$B = 2 \cdot (X_{Coil} + K_1 \cdot R_{OD}) \cdot \sin\left( \frac{\beta_S}{2} \right) + 2 \cdot (Z_{min} + Y_{Coil})$$

$$C = X_{Coil}^2 + (Z_{min} + Y_{Coil})^2 - R_{OD}^2$$

Using the quadratic formula the stator radius ($R_S$) can be determined: (NOTE: Taking positive quantity)

$$R_S = \frac{-B \pm \sqrt{B^2 - (4 \cdot A \cdot C)}}{2 \cdot A}$$

Once the stator radius ($R_S$) is known the remaining dimensions can be determined from equations (3-6).
NOTE: To guarantee no overlap between adjacent coils the following relationship must be satisfied;

$$(TW_S + X_{Coil}) < (R_S + Z_{min}) \cdot \tan\left( \frac{\Theta_P}{2} \right)$$

The air gap 40 dimension is fully dependant on machine size and application. Although the air gap is the most sensitive and dominant design requirement the following relationship will be used as a baseline approximation; which incorporates the manufacturing tolerances and mechanical deformations as a function of machine size. NOTE: In the embodiment shown, air gap is defined in millimetres (mm)

$$G = (0.7112) \cdot \left( \frac{R_S}{14.732} \right)$$

The rotor lamination design begins with the following defined parameters:
- Stator Radius: ($R_S$); Fixed
- Driveshaft Radius: ($R_{SH}$); Fixed
- Ratio of rotor pole height to pole pitch: ($K_3$); Variable The following equations are used to fully define the geometry of the rotor lamination: NOTE: In the example shown, all dimensions are in centimetres (cm)

$$R_R = R_S - G$$

$$TH_R = K_3 \cdot R_R \cdot \Theta_P$$

$$R_{RC} = R_R - TH_R$$

$$CW_R = R_{RC} - R_{SH}$$

NOTE: In order to optimize maximum core efficiency the rotor core width ($CW_R$) should satisfy the following relationship;

$$CW_R \geq CW_S$$

Figure 9C:
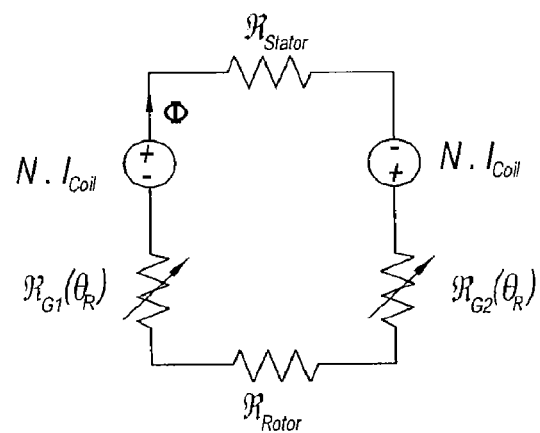
FIG. 9(c) illustrates an equivalent electric circuit of the invention.

Due to the inherent symmetry of the present invention, the complete magnetic path can generally speaking be resolved into an electrical equivalent circuit as illustrated in FIG. 9(c).

The total Magneto-Motive Force ($\mathfrak{S}_{Total}$) acting to drive Flux ($\Phi$) through the closed magnetic circuit loop, is defined by the following:

$$\mathfrak{S}_{Total} = 2 \cdot (N \cdot I_{Coil}) = \Phi \cdot \mathfrak{R}_{Total}(\theta_R) =$$
$$\Phi \cdot [\mathfrak{R}_{G1}(\theta_R) + \mathfrak{R}_{G2}(\theta_R) + \mathfrak{R}_{Stator} + \mathfrak{R}_{Rotor}]$$

Where the Inductance ($L(\theta_R)$) as a function of relative rotor angle ($\theta_R$) can be determined from the following relationship;

$$L(\theta_R) = \frac{(2 \cdot N)^2}{\mathfrak{R}_{Total}(\theta_R)}$$

The torque ($T_{fld}$) produced by the pole pair on the rotor as a function of winding current ($I_{Coil}$) and relative rotor angle ($\theta_R$) can be defined by the following relationship;

$$T_{fld} = \frac{I_{Coil}^2}{2} \cdot \frac{dL(\theta_R)}{d\theta_R}$$

Figure 10A:
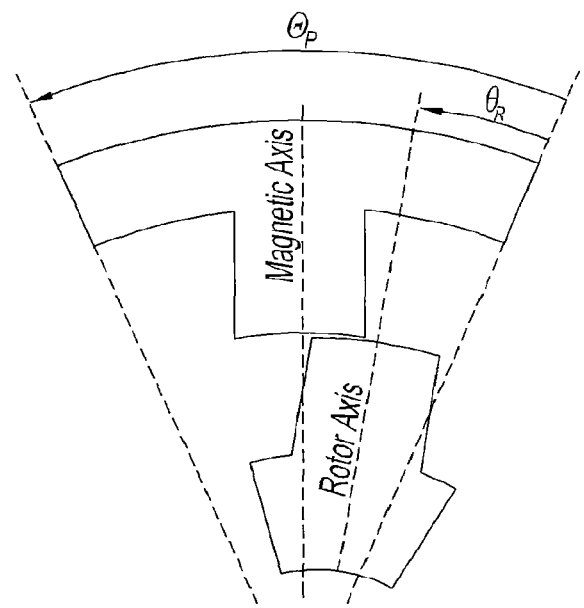
FIG. 10(a) is cross-sectional illustration of invention's reference angular reference frame.

FIG. 10(a) represents the coordinate system used in defining the relative rotor angle ($\theta_R$). From the figure the air-gap area is maximum when the rotor axis is fully aligned with the magnetic axis, or the 12 o'clock position in FIG. 10(a).

The cross-sectional area of the air-gap is determined by calculating the surface integral of the area confined by the stator and rotor pole tips, as defined below;

$$A_{G,max} = \int d\vec{S} = (R_S - 0.5 \cdot G) \cdot (SF \cdot SL) \cdot \beta_S$$

Neglecting the effects of fringing the cross-sectional area of the air-gap will vary linearly as a function of relative rotor angle ($\theta_R$).

$$A_G(\theta_R) = \frac{A_{G,max}}{\beta_S} \cdot (\theta_R - \theta_U) \text{ For,}$$

$$\theta_U < \theta_R \leq \frac{\Theta_P}{2}$$

The total equivalent circuit air-gap reluctance as a function of relative rotor angle ($\theta_R$) can be determined from the following;

$$\mathfrak{R}_G(\theta_R) = \mathfrak{R}_{G1}(\theta_R) + \mathfrak{R}_{G2}(\theta_R) = \frac{2 \cdot G \cdot \beta_S}{\mu_0 \cdot A_{G,max} \cdot (\theta_R - \theta_U)}$$

For, $$\theta_U < \theta_R \leq \frac{\Theta_P}{2}$$

Where the unaligned rotor angle ($\theta_U$) is defined as;

$$\theta_U = \frac{\Theta_P}{2} - \beta_S$$

Assuming a Counter Clockwise (CCW) rotation the Motoring region of the machine is defined when the relative rotor angle ($\theta_R$) lies between the following range;

$$\theta_U < \theta_R < \frac{\Theta_P}{2}$$

The Regeneration region is defined when the relative rotor angle ($\theta_R$) lies between the following range;

$$\frac{\Theta_P}{2} < \theta_R < \left(\frac{\Theta_P}{2} + \beta_S\right)$$

Neglecting the leakage inductances and assuming the magnetic core has infinite permeability, the maximum equivalent circuit inductance occurs when the rotor axis is fully aligned with the magnetic axis, as defined by the following;

$$L_{max} = \frac{(2 \cdot N)^2}{\mathfrak{R}_{G,min}} = \frac{(2 \cdot N)^2 \cdot \mu_0 \cdot (R_S - 0.5 \cdot G) \cdot (SF \cdot SL) \cdot \beta_S}{2 \cdot G}$$

Where the equivalent circuit inductance as a function of relative rotor position is defined as:

$$L(\theta_R) = \frac{L_{max}}{\beta_S}(\theta_R - \theta_U)$$

For, $$\theta_U < \theta_R \leq \frac{\Theta_P}{2}$$

The above relationship predicts that the inductance is zero when the rotor is at the unaligned position ($\theta_U$), where in fact there will be some finite value of inductance at this position.

The peak torque ($T_{fld}$) produced by the equivalent circuit pole pair is defined by the following relationship;

$$T_{fld} = \frac{I_{Coil}^2}{2} \cdot \frac{dL(\theta_R)}{d\theta_R} = \frac{L_{max} \cdot I_{Coil}^2}{2 \cdot \beta_S} = \frac{(2 \cdot N \cdot I_{Coil})^2 \cdot \mu_0 \cdot (R_S - 0.5 \cdot G) \cdot (SF \cdot SL)}{4 \cdot G}$$

The total stage peak torque ($T_M$) can be determined from the following relationship;

$$T_M = \frac{N_P}{2} \cdot T_{fld}$$

Figure 10B:
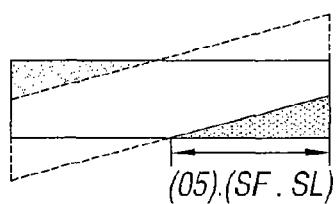
FIG. 10(b) is plan view illustration of the mechanical skewing of the rotor poles.

Some machine designs will require the addition of a mechanical skew 39 to the rotor. The mechanical skew will affect the machines generated torque waveform. The effect of the mechanical skew 39 will be to reduce the overlapping area of the air-gap, as shown in FIG. 10(*b*).

The cross-sectional area of the shaded region in the FIG. 10(*b*) can be calculated as follows:

$$A'_g \int d\vec{S} = R_S(0.5)(SF \cdot SL)\arcsin\left(\frac{(0.5)(SF \cdot SF)\tan(\alpha_S)}{R_S}\right)$$

Where the net effective air-gap area is determined as follows:

$$A'_{G,max} = A_{G,max} - A'_g =$$
$$(SF \cdot SL)\left[(R_S - 0.5G)\beta_S - R_S(0.5)\arcsin\left(\frac{(0.5)(SF \cdot SF)\tan(\alpha_S)}{R_S}\right)\right]$$

The stator reluctance can be resolved into two independent reluctances, as defined below;

$$\Re_{S1} = \frac{l_{CS1}}{\mu \cdot A_{CS1}} = \frac{2 \cdot (TH_S + 0.5 \cdot CW_S)}{\mu \cdot TW_S \cdot (SF \cdot SL)}$$

$$\Re_{S2} = \frac{l_{CS2}}{\mu \cdot A_{CS2}} = \frac{(R_{OD} - 0.5 \cdot CW_S) \cdot \Theta_P}{\mu \cdot CW_S \cdot (SF \cdot SL)}$$

The total stator reluctance is given as;

$$\Re_{Stator} = \Re_{S1} + \Re_{S2} =$$
$$\frac{1}{\mu \cdot (SF \cdot SL)} \cdot \left[\frac{2 \cdot (TH_S + 0.5 \cdot CW_S)}{TW_S} + \frac{(R_{OD} - 0.5 \cdot CW_S) \cdot \Theta_P}{CW_S}\right]$$

The rotor reluctance can be resolved into two independent reluctances, as defined below;

$$\Re_{R1} = \frac{l_{CR1}}{\mu \cdot A_{CR1}} = \frac{2 \cdot (TH_R + 0.5 \cdot CW_R)}{\mu \cdot TW_R \cdot (SF \cdot SL)}$$

$$\Re_{R2} = \frac{l_{CR2}}{\mu \cdot A_{CR2}} = \frac{(R_{RC} - 0.5 \cdot CW_R) \cdot \Theta_P}{\mu \cdot CW_R \cdot (SF \cdot SL)}$$

The total rotor reluctance is given as;

$$\Re_{Rotor} = \Re_{R1} + \Re_{R2} =$$
$$\frac{1}{\mu \cdot (SF \cdot SL)} \cdot \left[\frac{2 \cdot (TH_R + 0.5 \cdot CW_R)}{TW_R} + \frac{(R_{RC} - 0.5 \cdot CW_R) \cdot \Theta_P}{CW_R}\right]$$

The total core reluctance is then obtained, where;

$$\Re_{Core} = \Re_{Stator} + \Re_{Rotor}$$
$$\Re_{Core} = \frac{1}{\mu \cdot (SF \cdot SL)} \cdot \left[2 \cdot \left(\frac{TH_S + 0.5 \cdot CW_S}{TW_S} + \frac{TH_R + 0.5 \cdot CW_R}{TW_R}\right) + \left(\frac{R_{OD}}{CW_S} + \frac{R_{RC}}{CW_R} - 1\right) \cdot \Theta_P\right]$$

Neglecting the leakage inductances the maximum equivalent circuit inductance occurs when the rotor axis is fully aligned with the magnetic axis, as defined by the following;

$$L'_{max} = \frac{(2 \cdot N)^2}{\Re_{Core} + \Re_{G,min}}$$

Where the equivalent circuit inductance as a function of relative rotor position is defined as:

$$L'(\theta_R) = \frac{L'_{max}}{\beta_S}(\theta_R - \theta_U)$$

For, $$\theta_U < \theta_R \leq \frac{\Theta_P}{2}$$

The peak torque ($T'_{fld}$) produced by the equivalent circuit pole pair is defined by the following relationship;

$$T'_{fld} = \frac{I^2_{Coil}}{2} \cdot \frac{dL'(\theta_R)}{d\theta_R} = \frac{L'_{max} \cdot I^2_{Coil}}{2 \cdot \beta_S}$$

The total stage peak torque ($T'_M$) can be determined from the following relationship;

$$T'_M = \frac{N_P}{2} \cdot T'_{fld}$$

Due to the inherent symmetry of the invention (i.e., equal number of stator poles 25, and rotor poles 35 in each stage), each stage of the machine is completely independent and can be completely characterized by an equivalent tooth model, as shown in FIG. 9(*a*). Illustrated is the alignment of a stator pole 25 and a rotor pole 35, which forms the elemental magnetic circuit, related to each stator/rotor pole pair when energized. One possible geometry of the invention, with the various size relationships between the elements fixed for this particular design evaluation is shown. Because of this symmetry, the complete magnetic path can be resolved into a single electrical equivalent circuit FIG. 9(*c*) and investigated with respect to angular motion and effects of the air gap 40 on performance FIG. 8(*a*). In one final form, the invention design technique reduces the complete simulation environment to the form shown in FIGS. 9(*a*) and 9(*c*).

The modelling design was possible utilizing a simple magnetic design element comprising one stator pole and its opposite rotor pole and linked to: the diameter of the rotor; the stator winding ampere turns; the volume of the air gap; the length of the rotor poles; the length of the stator poles; the angular displacement of the stator and rotor poles one to the other; the thickness of the stator back iron; the depth of the rotor root; the diameter of the shaft.

Once the parameters were identified, a Finite Element Analysis (FEA) software program was used to simulate the magnetic flux and forces/currents generated when varying amounts of electrical energy are applied to the stator windings.

A mathematical program providing the sum of the magnetic flux and forces/currents in all of the poles from each stage of the machine.

A Response Surface Model that simulates and maps the magnetic flux and forces/currents generated from a given configuration of the multi-stage variable reluctance motor/generator when all three stages of the machine are energized according to a controlled sequence according to the motor/generator control conventions established in the invention.

Motor/Generator Controller

The preferred embodiment of the present invention includes an electrical energy control system consisting of electrical switchgear, sensing elements (rotor position, voltage, current, inductance, torque and temperature), programmable controllers and software using a control algorithm, which supports the switching of the stage inductance value to achieve torque regulation throughout the operating, range of the machine. Braking or regeneration is accomplished by delaying the stage winding firing angle Specifically, the invention control consists of a proportional integral controller (PI Controller), Firing Angle Controller and Gating Controller to deliver appropriate gating signals to the H-bridge to drive the multistage reluctance motor, i.e., MSRM.

Figure 11:
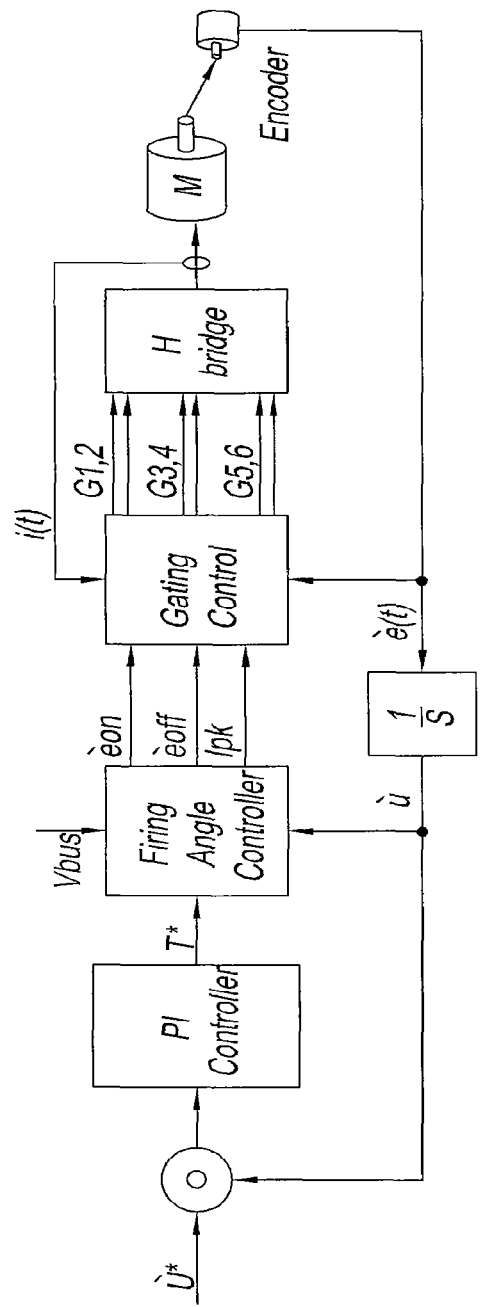
FIG. 11 illustrates a typical encoder based control implementation

In FIG. 11 a typical encoder based control implementation is illustrated wherein the rotor position is obtained directly from the motor shaft. This positional information is fed to an integrator, which is used in conjunction with the demand speed to deliver an error signal to the series of controller blocks. The PI Controller is implemented in discrete time and produces a demand torque from the speed error signal presented to it. The Firing Angle Controller uses the demand torque in conjunction with the actual speed and bus voltage to determine the optimum firing angles and peak winding current to produce the desired torque.

Figure 12:
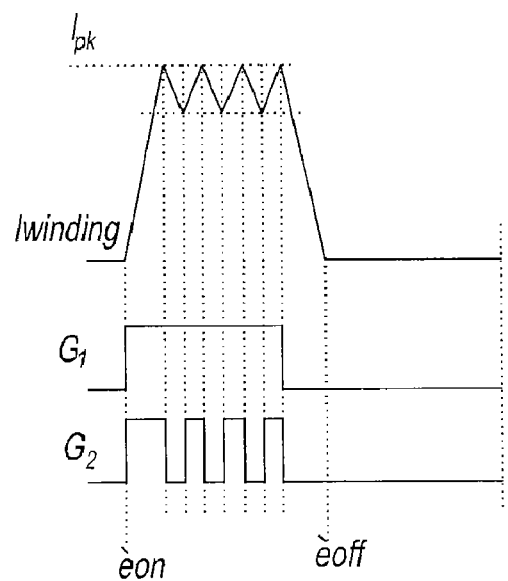
FIG. 12 illustrates the "firing angles" versus angular position of the rotor poles.

Firing angles (θon and θoff) define the angular position of the rotor at which winding current is applied as can be seen in FIG. 12. The rotor position is interpolated from the shaft-mounted encoder or from a mathematical extrapolation of the resulting current waveform from the previous or present winding current behaviour. The present rotor position, applied bus voltage and rotational speed of the motor are used in conjunction with a mathematical equation and/or lookup table to determine the appropriate ON and OFF angles for the winding excitation.

These angles are dynamic using the aforementioned information and contribute to the overall performance and efficiency of the motor. Adjustments of these angles allow the motor to work in both motoring and generating modes of the invention.

Figure 13:
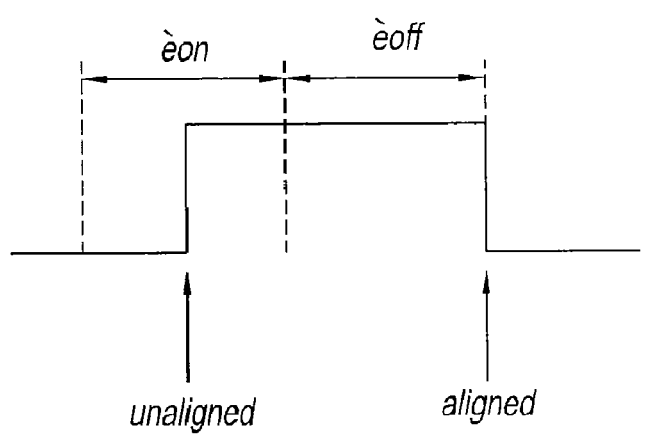
FIG. 13 illustrates the waveform depicting the "on" period of winding excitation.

The waveform in FIG. 13 depicts the "on" period of the winding excitation. As a side note, it is also directly related to the non-commutating IGBT (Insulated Gate Bipolar Transistor) during rotation.

Figure 14:
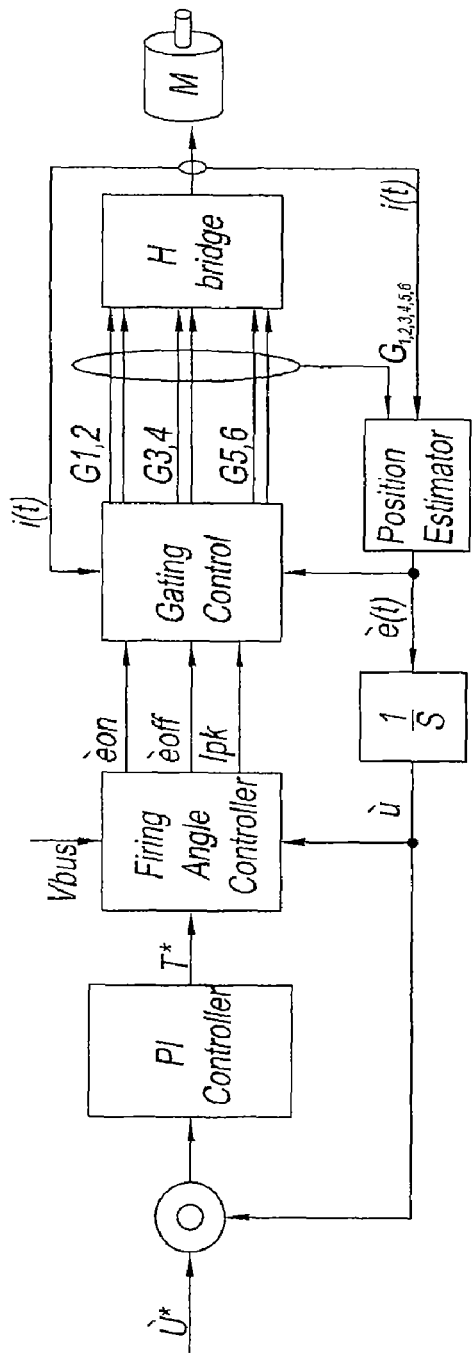
FIG. 14 illustrates an encoder-less control scheme.
Figure 15:
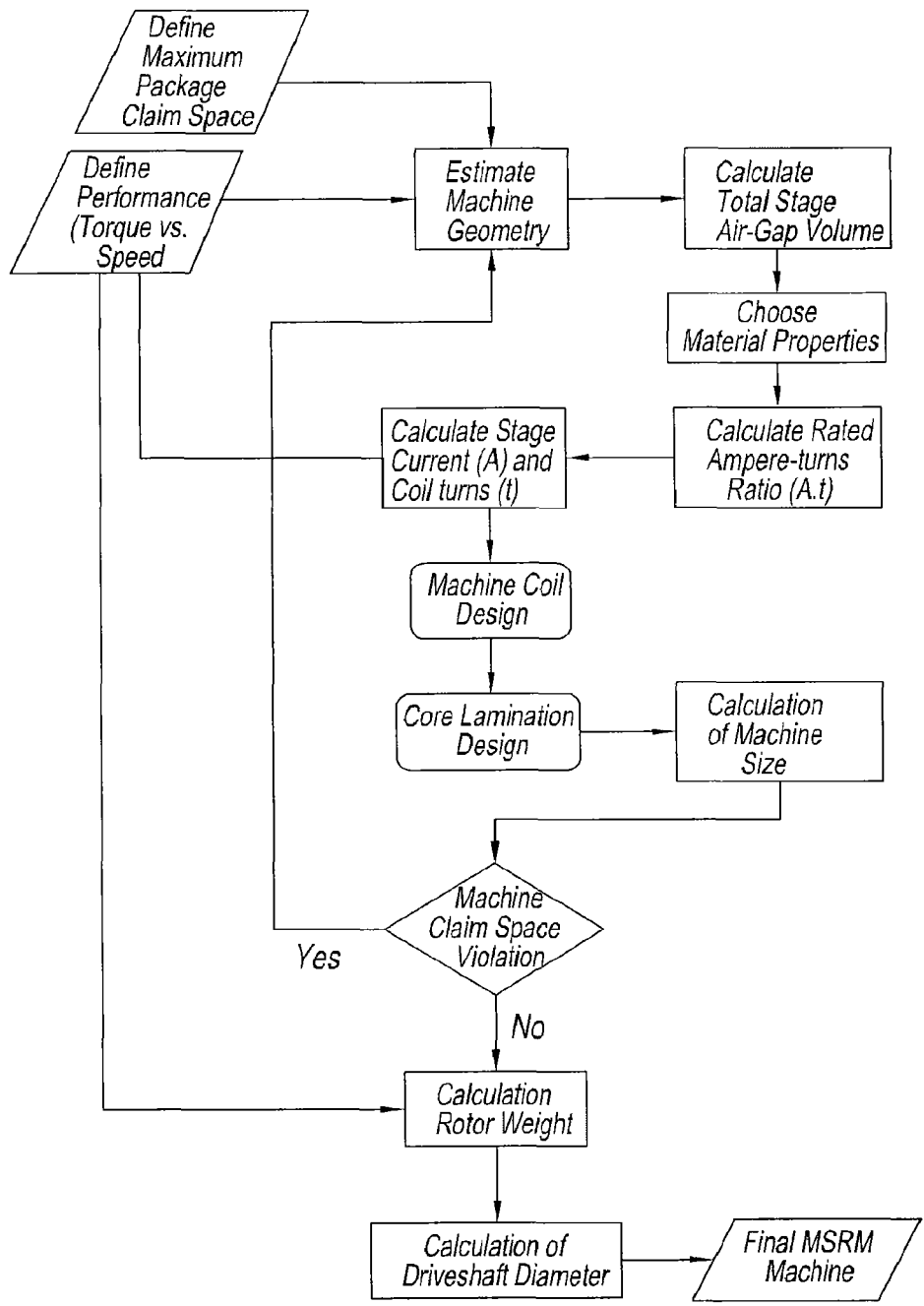
FIG. 15 illustrates a flowchart description of the motor/generator modelling process.

FIG. 14 shows an implementation of an encoder-less control scheme. In this implementation, the Position Estimator block can look at the current through the windings and knowing the flux linkage behaviour of the machine, determine the angular position of a pole pair. This information is fed back into the Gating Controller and further integrated to provide the estimated speed of the machine.

Since this technique suffers at low speed operation and during start up, the position estimator uses the frequency of the commutation gating signal to determine the instantaneous inductance and from that the angular position.

The use of i(t) into the Position Estimator, though providing the most accurate high speed estimation, can be eliminated and the use of the gating signals to be the only method of position estimation. This later method reduces processor requirements resulting in a less expensive design.

The invention described above shows a casing having an interior and a longitudinal axis which provides a means to support a plurality of interior rotor assemblies for rotation as well as support a concentrically mounted shaft which in turns supports and allows the means by which the rotor assemblies are capable of rotating. Moreover the casing supports a plurality of interior stators in a fixed and static position with respect to the rotational motion of the rotors and provides a means of external and internal cooling of the internal heat losses generator by the machine. Also the casing provides for the inclusion of 2 or more bearing/seal assemblies to support the mass and rotational forces generated by the rotor assemblies.

The plurality of stator assemblies, each having a monolithic mass of some determinate length with respect to the rotational axis of the machine formed of magnetically permeable, individually insulated, metal laminations formed to provide a plurality of stator poles facing inwardly towards the rotational axis of the machine and evenly spaced circumferentially about the central axis of the casing and held together and separate by a common support structure or back iron.

Also the plurality of rotor assemblies, each having a monolithic mass of some determinate length with respect to the rotational axis of the machine formed of magnetically permeable, individually insulated, metal laminations formed to provide a plurality of rotor poles facing outwardly from the rotational axis of the machine, in number and radial spacing identical to the number and radial spacing of the matching rotor assembly poles.

The electro-magnetic coil assemblies can be formed of highly conductive material having the form of either wire, sheet or bar. The number of coil assemblies are equal to the number of stator poles provided for in each stator assembly; wherein the assembly is formed around and tightly to, each stator pole in each stator assembly; leaving the inwardly facing pole face free and unobstructed.

In one arrangement of the invention, any stator pole winding, the two adjacent pole windings are wound with an opposite polarity such to remove ½ of the total magnetic flux produced said coil which results in the Electrical Equivalent Circuit shown in FIG. 9(c)

One mode of the invention relates to a machine that would provide torque through the rotor shaft to a mechanical load.

In the generator mode a source of mechanical power input would be transferred to the rotor by means of its main shaft; together with an electrical load and/or storage system capable of utilization/storage of the electrical energy developed.

In one of the embodiments of the invention 3 stages, each stage comprising one stator assembly and one rotor assembly are exhibited. Within each stage assembly, the preferred configuration would exhibit 12 stator poles and 12 rotor poles.

As an example the poles of each of the different rotor stages are structurally offset one from the other at an radial angle of 10 degrees (in the case of a 3 stage, 12 pole machine), and further wherein all of the poles of each of the different rotor stages are skewed at a predetermined angle to the axis of rotation.

In one arrangement the rotor surrounds the stator.

The invention described above shows a multi-stage, variable reluctance motor/generator design technique which comprises:

(a) a simple magnetic design element comprising one stator pole and its opposite rotor pole and linked to: the diameter of the rotor; the stator winding ampere turns; the volume of the air gap; the length of the rotor poles; the length of the stator poles; the angular displacement of the stator and rotor poles one to the other; the thickness of the stator back iron; the depth of the rotor root; the diameter of the shaft.

(b) a Finite Element Analysis (FEA) software program to simulate the magnetic flux and forces/currents generated when varying amounts of electrical energy are applied to the stator windings.

(c) a mathematical program providing the sum of the magnetic flux and forces/currents in all of the poles from each stage of the machine.

(d) a Response Surface Model that simulates and maps the magnetic flux and forces/currents generated from a given configuration of the multi-stage variable reluctance motor/generator when all three stages of the machine are energized according to a controlled sequence according to the motor/generator control conventions established in the invention.

The invention described above shows a multiplicity of motor/generator casing designs, each casing formed of heat conducting material intimately and thermally connected to the machine stators and comprising a number of heat removal strategies such as: a multiplicity of fins located on the outer surface of the casing allowing for convective and radiation cooling from the casing surface; the addition of a shroud over the external fins to allow forced air cooling of the space formed between the casing, the fins and the shroud; a multiplicity of internal passages or tubes providing the means to remove heat from the casing with the use of a liquid coolant in combination with a pump and heat exchanger; a multiplicity of internal passages combined with internal spray nozzles providing the means to remove heat from the casing with the use of a liquid coolant or evaporative coolant in combination with a pump and a heat exchanger/condenser.

Also the invention described shows an electrical energy control system consisting of electrical switchgear, sensing elements (rotor position, voltage, current, inductance, torque and temperature), programmable controllers and software using a control algorithm, which supports the switching of the stage inductance value to achieve torque regulation throughout the operating, range of the machine. Braking or regeneration is accomplished by delaying the stage winding firing angle.

As described above, the coils within each stage of the invention were wound in the same manner and energized in parallel so as to achieve a certain base speed and base output torque/electrical current as defined uniquely by the plurality of uses that the device could be put to. Coil current contributes directly towards torque production in the device; increasing coil current, increases torque output of the device. At a selected torque output and base operating speed, the bus voltage and the stage current are set at their rated values; these ratings then determine the nominal sizing of the device controller and electrical conductor sizing within the device.

In applications requiring higher than nominal torque output for short time durations, over sizing of the electrical conductors to handle higher current loads within the machine does allow the possibility of improving the peak output operation of the device; however, space and heat transfer limitations within the device prevent utilizing the full potential of the device. Additionally, for each application, the electrical controller is designed to operate at the base voltage/current ratings of the particular performance requirements of the device. Demanding larger throughput currents of the controller requires that the controller also be oversized which then affects performance efficiencies and production costs for those applications, which may require short duration increases in the torque output of the device.

In one embodiment the invention relates to the parallel connection of the coils in each stage of the device. When coils are connected in parallel, the coil current is 1/Np of the base stage current (where Np equals the number of poles). The parallel-connected arrangement for the device is preferred as it allows the machine to achieve a high base speed for a given base voltage. However, parallel-connected coils suffer at low speed because the equivalent stage inductance and resistance is low; thus increasing switching losses and torque ripple effects.

Accordingly, the device may be constructed for special applications so as to allow the individual stage coils to be connected either in parallel (outlined above) or in series as required by the nominal and momentary design requirements of the device.

When coils are connected in series, the coil current can approach the base stage current and thus can achieve very high starting toques. With the stage coils wired in series, larger torque production for a given bus voltage/stage current and controller design can be achieved. Coils connected in series have a higher equivalent stage inductance and resistance; thus offering improvement in both switching losses and torque ripple effect; however, with a loss to the base speed design of the device.

In another embodiment of the invention, each set of the stage coils will be able to operate in both parallel and series mode. Moreover the coils can be configured in a single series chain for coils for each stage, or in groups of coils within each stage wired in parallel which are in turn wired in series with each other depending on the specific requirements of the design.

The switching between parallel and series operation may be undertaken by either mechanical or electrical means and that such switching may also occur by means of either mechanical or electrical inputs.

Figure 16A:
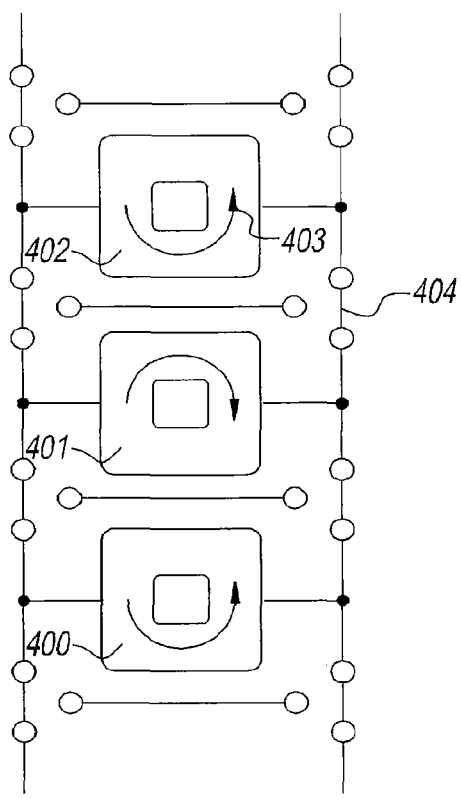
FIG. 16(a) illustrates the coil winding direction and electrical connections for parallel connections.
Figure 16B:
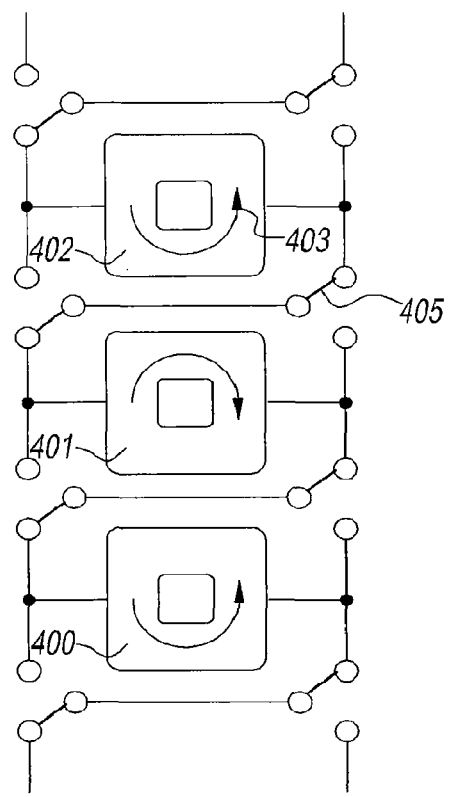
FIG. 16(b) illustrates the coil winding direction and electrical connections for the series connections.

As illustrated in the exploded view of FIGS. 16a and 16b, one embodiment of the electrical portion of the invention illustrates three of the plurality of coils found in a typical stage of the invention. Coil 1 400, coil 2 401 and coil 3 402 are illustrated as three of a plurality of poles within each stage of the device. As illustrated each coil has the coil winding direction 403 shown as having alternate rotations for each coil such that each adjacent coil would have windings wound in the opposing direction.

FIG. 16(a) illustrates the coils being wound in parallel with the switch 404 directing the current to the same side of each coil. The switch 404 may either be a mechanical switch, which in one embodiment may be operated by the rotational speed of the device; or it may be an electrical switch, which could be operated in one embodiment by the current flow through the switch. The current will follow the direction of the winding 403.

FIG. 16(b) illustrates the coils being wound in series with the switch 405 directing the current to the opposite side of each coil. The switch 405 may either be a mechanical switch, which in one embodiment may be operated by the rotational speed of the device; or it may be an electrical switch, which could be operated in one embodiment by the current flow through the switch.

The current starts in the lower left hand corner of FIG. 16(b), where the coils 400, 401, and 402 have the same current with different voltage drop.

It will be appreciated by those skilled in the art that other variations of the one or more embodiments described herein are possible and may be practised without departing from the scope of the present invention.

What is claimed is:

1. A multi-stage, variable reluctance device comprising:
   (a) a shaft having an axis of rotation;
   (b) a plurality of spaced stages disposed about said axis of rotation;
   each stage having an equal number of stator and rotor poles defining stator and rotor pole pairs, symmetrically disposed about said axis of rotation, and having an airspace therebetween;
   (c) means for energizing all stator poles of one of said stages at the same time for a selected time interval
   (d) means for sequentially and repeatedly energizing all stator poles of said other stages,
      wherein each stator and rotor pole pair in a stage has substantially the same physical and electrical characteristic.

2. A multi-stage, variable reluctance device as claimed in claim 1 wherein the stator and rotor poles are housed in a casing.

3. A multi-stage, variable reluctance device as claimed in claim 2 wherein adjacent rotor poles on adjacent stages are offset from each other.

4. A multi-stage, variable reluctance device as claimed in claim 3 wherein each rotor pole in a stage is skewed in relation to each other.

5. A multi-stage, variable reluctance device as claimed in claim 4 wherein stators on adjacent stages are offset from each other.

6. A multi-stage, variable reluctance device as claimed in claim 5 wherein said stator of a stage is skewed in relation to each other.

7. A method for enabling the selective reduction of multi-stage variable reluctance motor/generators having a plurality of spaced stages about an axis of rotation, where each stage has an equal number of stator and rotor poles, defining stator and rotor pole pairs symmetrically disposed about the axis of rotation and having an air space therebetween, comprising:
   (a) selecting a single stator and rotor pair for each stage,
   (b) determining for each single stator and rotor pair criteria selected from the group of physical and electrical characteristics for said single stator and rotor pair in such stage, and
   (c) producing all of said stator and rotor pairs in such stage from such criteria from said single stator and rotor repair.

8. A method as claimed in claim 7 wherein said group comprises a diameter of a rotor, a stator winding ampere turns, volume of air gap, a link of rotor pairs, length of stator poles, angular displacement of said stator and rotor pole pairs, thickness of stator backiron, depth of rotor route and diameter of shaft.

* * * * *